United States Patent
Shao et al.

(10) Patent No.: US 12,069,082 B2
(45) Date of Patent: Aug. 20, 2024

(54) INTERPRETING AND REMEDIATING NETWORK RISK USING MACHINE LEARNING

(71) Applicant: Cisco Technology, Inc., San Jose, CA (US)

(72) Inventors: Qihong Shao, Clyde Hill, WA (US); Xinjun Zhang, San Jose, CA (US); Yue Liu, Santa Clara, CA (US); Kevin Broich, Cary, NC (US); Kenneth Charles Croley, Oakland, CA (US); Gurvinder P. Singh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 572 days.

(21) Appl. No.: 17/345,640

(22) Filed: Jun. 11, 2021

(65) Prior Publication Data
US 2022/0400131 A1   Dec. 15, 2022

(51) Int. Cl.
| | |
|---|---|
| H04L 9/40 | (2022.01) |
| G06F 21/57 | (2013.01) |
| G06F 40/295 | (2020.01) |
| G06N 3/045 | (2023.01) |
| G06N 3/08 | (2023.01) |

(52) U.S. Cl.
CPC ........ *H04L 63/1433* (2013.01); *G06F 21/577* (2013.01); *G06F 40/295* (2020.01); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 10,616,257 B1 | 4/2020 | Soulhi et al. | |
| 10,637,884 B2 * | 4/2020 | Apple | ................ H04L 63/1416 |

(Continued)

FOREIGN PATENT DOCUMENTS

WO   2020018392 A1   1/2020

OTHER PUBLICATIONS

Keramati, Marjan et al., "Novel Security Metrics for Ranking Vulnerabilities in Computer Networks", 7th International Symposium on Telecommunications (IST'2014), pp. 883-888. (Year: 2014).*

(Continued)

*Primary Examiner* — Michael Pyzocha
(74) *Attorney, Agent, or Firm* — Edell, Shapiro & Finnan, LLC

(57) ABSTRACT

A method, computer system, and computer program product are provided for mitigating network risk. A plurality of risk reports corresponding to a plurality of network devices in a network are processed to determine a multidimensional risk score for the network. The plurality of risk reports are analyzed using a semantic analysis model to identify one or more factors that contribute to the multidimensional risk score. One or more actions are determined using a trained learning model to mitigate one or more dimensions of the multidimensional risk score. The outcomes of applying the one or more actions are presented to a user to indicate an effect of each of the one or more actions on the multidimensional risk score for the network.

20 Claims, 16 Drawing Sheets

(56) References Cited

U.S. PATENT DOCUMENTS

| | | | |
|---|---|---|---|
| 11,470,106 B1* | 10/2022 | Lin | H04L 63/1433 |
| 11,552,974 B1* | 1/2023 | Bagga | H04L 65/61 |
| 11,556,815 B1* | 1/2023 | Stave | G06N 20/20 |
| 11,657,269 B2* | 5/2023 | Che | G06F 17/18 706/25 |
| 11,757,907 B1* | 9/2023 | Berger | H04L 63/1425 726/23 |
| 2014/0137257 A1* | 5/2014 | Martinez | H04L 63/1433 726/25 |
| 2015/0373043 A1 | 12/2015 | Wang et al. | |
| 2018/0248895 A1* | 8/2018 | Watson | H04L 63/083 |
| 2019/0089725 A1* | 3/2019 | Anachi | G06N 20/00 |
| 2019/0124104 A1 | 4/2019 | Apostopoulos | |
| 2019/0149425 A1 | 5/2019 | Larish et al. | |
| 2019/0182287 A1 | 6/2019 | Hanley et al. | |
| 2019/0245882 A1* | 8/2019 | Kesavan | G06N 3/006 |
| 2019/0268366 A1 | 8/2019 | Zeng et al. | |
| 2019/0324744 A1* | 10/2019 | Alam | G06F 8/31 |
| 2020/0067935 A1* | 2/2020 | Carnes, III | H04L 63/101 |
| 2020/0076835 A1 | 3/2020 | Ladnai et al. | |
| 2020/0162341 A1 | 5/2020 | Vasseur et al. | |
| 2020/0195679 A1 | 6/2020 | Du | |
| 2020/0202268 A1 | 6/2020 | Retna et al. | |
| 2020/0218937 A1 | 7/2020 | Visentini Scarzanella et al. | |
| 2020/0314134 A1* | 10/2020 | Izrael | H04L 63/1425 |
| 2020/0351284 A1* | 11/2020 | Davis | H04L 63/1425 |
| 2020/0367078 A1 | 11/2020 | Deb et al. | |
| 2020/0382538 A1* | 12/2020 | Feezell | H04L 63/1433 |
| 2020/0410362 A1 | 12/2020 | Turner et al. | |
| 2021/0021629 A1* | 1/2021 | Dani | H04L 63/1433 |
| 2021/0037038 A1* | 2/2021 | Alsharif | A61B 34/10 |
| 2021/0081189 A1* | 3/2021 | Nucci | G06F 16/252 |
| 2022/0014554 A1* | 1/2022 | Vasu | H04L 63/102 |
| 2022/0131761 A1* | 4/2022 | Shao | H04L 41/5067 |
| 2022/0131887 A1* | 4/2022 | Ngweta | G06F 21/577 |
| 2022/0180157 A1* | 6/2022 | Eykholt | G06N 3/063 |
| 2022/0309155 A1* | 9/2022 | Payne | G06N 3/0464 |
| 2022/0360602 A1* | 11/2022 | Rose | H04L 63/1433 |
| 2022/0377093 A1* | 11/2022 | Crabtree | H04L 43/045 |
| 2022/0377099 A1* | 11/2022 | Berger | H04L 63/1408 |
| 2022/0377100 A1* | 11/2022 | Xiao | H04L 63/1433 |
| 2023/0036159 A1* | 2/2023 | Duppils | G06N 3/047 |

OTHER PUBLICATIONS

Hu, Jingjing et al., "I-HMM-Based Multidimensional Network Security Risk Assessment", Digital Object Identifier 10.1109/ACCESS.2019.2961997, Dec. 24, 2019, 12 pages.

Ian J. Goodfellow et al., "Generative Adversarial Nets", 2014, retrieved from Internet Oct. 22, 2020, 9 pages; https://papers.nips.cc/paper/5423-generative adversarial-nets.pdf.

Sahar Tavakoli et al., "Learning Social Graph Topologies using Generative Adversarial Neural Networks", Jun. 2017, retrieved from Internet Oct. 22, 2020, 10 pages; http://ial.eecs.ucf.edu/pdf/Sukthankar-SBP2017LateBreak.pdf.

Tsung-Yen Yang et al., "Learning Informative and Private Representations via Generative Adversarial Networks", retrieved from Internet Oct. 22, 2020, 10 pages; http://www.cbrinton.net/18bigdata.pdf.

Jason Devlin et al., "BERT: Pre-training of Deep Bidirectional Transformers for Language Understanding", Association for Computational Linguistics, https://www.aclweb.org/anthology/N19-1423/, Jun. 2019, 16 pages.

Hu Xu et al., "Double Embeddings and CNN-based Sequence Labeling for Aspect Extraction", Association for Computational Linguistics, https://www.aclweb.org/anthology/P18-2094/, Jul. 2018, 7 pages.

Qihong Shao et al., "Self-Adaptive Anomaly Detection With Deep Reinforcement Learning and Topology", Technical Disclosure Commons, https://www.tdcommons.org/dpubs_series/4369, Jan. 6, 2021, 14 pages.

* cited by examiner

TRACK OF TOP ISSUES FOR CUSTOMER A

| 1210 ↗ | GEO/ROLE 1 | GEO/ROLE 2 | GEO/ROLE 3 | GEO/ROLE 4 | GEO/ROLE 5 |
|---|---|---|---|---|---|
| CONFIG_ASSIT | 37.0 | 39.0 | 33.0 | 29.0 | 20.0 |
| ERROR_MSG | 17.0 | 12.0 | 22.0 | 24.0 | 36.0 |
| LICENSING | 10.0 | 9.0 | 1.0 | 5.0 | 2.0 |
| SOFTWARE_FAILURE | 9.0 | 6.0 | 22.0 | 5.0 | 17.0 |
| SUBSCRIPTION_MGMT | 8.0 | 16.0 | 0.5 | 0.0 | 1.0 |
| HARDWARE_FAILURE | 8.0 | 10.0 | 5.0 | 10.0 | 11.0 |
| INSTLL_UNSTLL_UPGRD | 3.0 | 2.0 | 4.0 | 14.0 | 3.0 |

INTERPRETING AND REMEDIATING NETWORK RISK USING MACHINE LEARNING

TECHNICAL FIELD

The present disclosure relates to computer networking, and more specifically, to using machine learning models to assess, interpret, and remediate network risk.

BACKGROUND

In the field of computer networking, network risk refers to any potential or actual issues that may negatively impact the functionality of devices in a network. For example, the presence of security vulnerabilities, hardware that is no longer supported by the manufacturer, or incompatible software configurations can all be sources of risk for a network. Network administrators may have difficulty understanding network risk in terms of both the factors that contribute to risk, and the severity of those contributing factors. Moreover, network administrators may also struggle with planning how to approach and remediate risk.

BRIEF DESCRIPTION OF THE DRAWINGS

FIG. 12 is a heatmap diagram depicting contributing factors to risk by category, in accordance with an example embodiment.

DESCRIPTION OF EXAMPLE EMBODIMENTS

Overview

Figure 1:
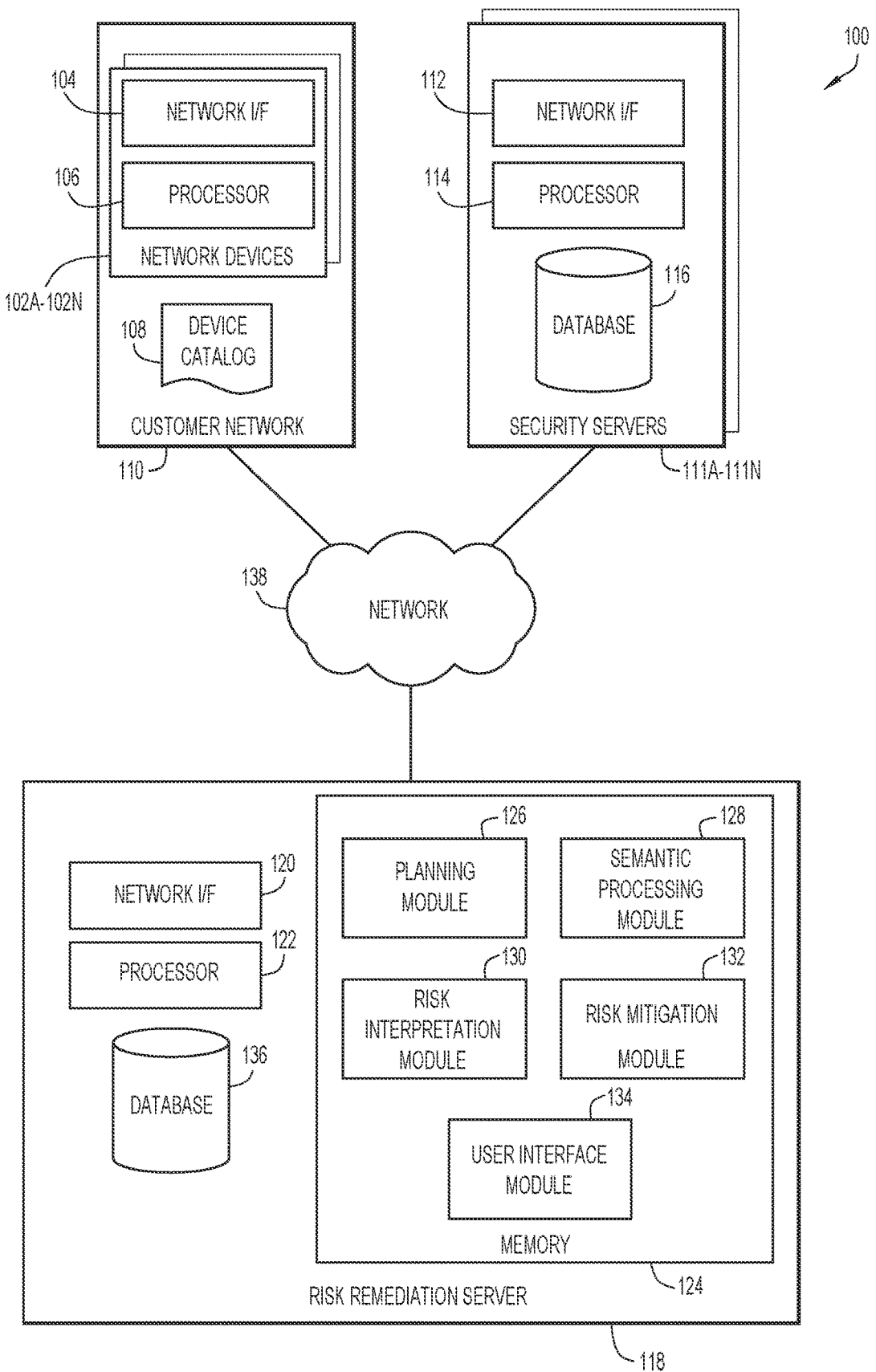
FIG. 1 is a block diagram depicting an environment for interpreting and remediating network risk, in accordance with an example embodiment.

According to one embodiment, techniques are provided for mitigating network risk. A plurality of risk reports corresponding to a plurality of network devices in a network are processed to determine a multidimensional risk score for the network. The plurality of risk reports are analyzed using a semantic analysis model to identify one or more factors that contribute to the multidimensional risk score. One or more actions are determined using a trained learning model to mitigate one or more dimensions of the multidimensional risk score. The outcomes of applying the one or more actions are presented to a user to indicate an effect of each of the one or more actions on the multidimensional risk score for the network.

Example Embodiments

Embodiments are provided for computer networking, and more specifically, for using machine learning models to assess, interpret, and remediate network risk.

Network risk remediation refers to the process of identifying, interpreting, and addressing potential or actual issues that may negatively impact the functionality of devices in a network. Accurately and clearly describing risk for an entire network of devices can be difficult, as different aspects of risk can be challenging to compare, and a single, overall risk value may not fully convey the nature and degree of risk to which the network may be exposed. Thus, conventional techniques typically fail to provide details explaining the reasoning behind risk scores, such as failing to identify the factors which contribute to a risk score and the severity of each factor. Additionally, conventional approaches to network risk analysis may not provide network administrators with actionable insights, such as specific actions that can be performed to remedy potential or actual risks in a network.

In contrast, the embodiments described herein utilize machine learning techniques to automatically assess risk in a network, provide users with an understanding of how risk is derived, and suggest actions that, when performed, will mitigate risk in a network. In particular, present embodiments apply natural language processing and deep learning techniques to provide suggestions and recommendations for remediating network risk. Moreover, risk remediation can be planned in advance by enabling users to see the impact, in terms of risk, that recommended actions would have on a network. Thus, present embodiments provide a technical improvement to cybersecurity and network risk remediation by implementing novel machine learning techniques to identify, explain, and plan the mitigation of network risk in a fully-automated manner. Moreover, present embodiments provide the practical application of enabling users to plan particular strategies for mitigating risk by identifying and prioritizing actions that address the most severe contributing factors of risk to a network, thereby enabling network risk to be rapidly mitigated based on the urgency of each potential source of risk.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for interpreting and remediating network risk, in accordance with an example embodiment. As depicted, environment 100 includes one or more network devices 102A-102N of a customer network 110, one or more security servers 111A-111N, a risk remediation server 118, and a (communication) network 138. It is to be understood that the functional division among components of environment 100 have been chosen for purposes of explaining various embodiments and is not to be construed as a limiting example.

Network devices 102A-102N each include a network interface (I/F) 104, and at least one processor 106. The network devices 102A-102N may further include network processing hardware (e.g., one or more Application Specific Integrated Circuits). Each network device 102A-102N may be a server, a router, a hub, a switch, a bridge, a gateway, a modem, a repeater, an access point, a firewall, storage device, computing device, an endpoint device (e.g., a laptop computer, a tablet computer, a netbook computer, a personal computer (PC), a desktop computer, a personal digital assistant (PDA), or a smart phone) or any other programmable electronic device capable of executing computer readable program instructions and performing networking-related operations in customer network 110. Network interface 104 enables each network device 102A-102N to send and receive data over a network, such as network 138, as well as within customer network 110. In general, network devices 102A-102N may perform any networking or computing task, including transmitting, receiving, and/or processing of data obtained from, or provided to, network-accessible computing devices, including devices internal and/or external to customer network 110. Each network device 102A-102N may include internal and external hardware components, as depicted and described in further detail with respect to FIG. 16. Moreover, the network devices 102A-102N may be virtual in the sense that they are embodied as software running on a computing device.

Customer network 110 may include a device catalog 108 that includes an inventory of network devices 102A-102N associated with customer network 110, including hardware specifications, a list of installed software and firmware, roles of each network device 102A-102N in customer network 110, and any other data or metadata, including versioning information, error reports, and the like.

Security servers 111A-111N each include a network interface (I/F) 112, at least one processor 114, and a database 116. Each security server 111A-111N may include a rack-mounted server, or any other programmable electronic device capable of executing computer readable program instructions. Network interface 112 enables components of each security server 111A-111N to send and receive data over a network, such as network 138. Security servers 111A-111N may include internal and external hardware components, as depicted and described in further detail with respect to FIG. 16.

In general, each security server 111A-111N provides, or otherwise makes available, risk reports for relevant computing devices, such as network devices 102A-102N. Each security server 111A-111N may be associated with one or more providers of hardware and/or software that is/are in use by any of network devices 102A-102N. Each risk report may indicate impacted hardware and/or software modules, and each risk report may include a description of the risk and/or the nature of the impact.

In some embodiments, the risk reports may include best practices reports, which may describe recommended settings or configurations of the hardware and/or software components of network devices. For example, best practices reports may include a recommendation to use a particular data encryption mechanism, a recommended firewall rule, a suggested password strength, and the like. In some embodiments, the risk reports may include security advisory reports, such as new viruses, worms, or other malware, zero-day vulnerabilities, current denial-of-service attacks, and the like. In some embodiments, the risk reports include field notice reports, which outline issues that are not security vulnerability-related, but can otherwise relate to risk. Field notice reports may include upgrades, workarounds, or other changes to hardware and/or software of network devices 102A-102N. In some embodiments, risk reports may include product security incident response team reports, which can include any reports generated by users who respond to security incidents. In some embodiments, risk reports include hardware and/or software end-of-life reports, which indicate a lifecycle of the hardware and/or software, including a planned end date for customer support, updates, hotfixes, availability of replacement parts, and the like. While security servers 111A-111N can serve as external sources of risk reports, in some embodiments, risk reports can additionally or alternatively be obtained from sources internal to customer network 110 (e.g., provided by a user or network device associated with customer network 110). Each risk report can also include an indication of a severity of risk, such as a "low" risk or "high" risk, or the risk severity can be indicated according to a numerical scale or other metric. In some embodiments, risk reports are categorized to a particular dimension of risk and/or tagged with a risk severity using one or more trained machine learning models.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store data relating to risk reports, including new and previous risk reports. Database 116 may make risk reports accessible, via network 138, to external entities, such as network devices 102A-102N of customer network 110 and/or risk remediation server 118. Additionally or alternatively, security servers 111A-111N may provide data stored in database 116 to external destinations, either on an ad hoc basis (e.g., as reports become available) or according to a predetermined schedule.

Risk remediation server 118 includes a network interface (I/F) 120, at least one processor 122, memory 124, and database 136. Memory 124 stores software instructions for a planning module 126, a semantic processing module 128, a risk interpretation module 130, a risk mitigation module 132, and a user interface module 134. Risk remediation server 118 may include a rack-mounted server, or any other programmable electronic device capable of executing computer readable program instructions. Network interface 120 enables components of risk remediation server 118 to send and receive data over a network, such as network 138. In general, risk remediation server 118 enables risk to be assessed, interpreted, and mitigated for devices in an organization, such as network devices 102A-102N of customer network 110. Risk remediation server 118 may include internal and external hardware components, as depicted and described in further detail with respect to FIG. 16.

Planning module 126, semantic processing module 128, risk interpretation module 130, risk mitigation module 132, and user interface module 134 may include one or more modules or units to perform various functions of the embodiments described below. Planning module 126, semantic processing module 128, risk interpretation module 130, risk mitigation module 132, and user interface module 134 may be implemented by any combination of any quantity of software and/or hardware modules or units, and may reside within memory 124 of risk remediation server 118 for execution by a processor, such as processor 122.

Planning module 126 enables risk scores to be computed for a network of devices, such as network devices 102A-102N, and enables a user to plan how actions that mitigate risk will affect the network by demonstrating any resulting changes to the risk scores if those actions were to be applied. Initially, planning module 126 may obtain or receive risk reports that relate to network devices 102A-102N, which may be obtained and/or received from customer network 110 and/or security servers 111A-111N. For example, risk reports can be obtained from database 116 of security servers 111A-111N and/or from other network-accessible locations, including cloud locations. Planning module 126 may categorize reports into one or more dimensions of risk, such as a best practices dimension, a security advisories dimension, a field notices dimension, a software end-of-life dimension, and a hardware end-of-life dimension. A report can be associated with one or more dimensions of risk based on metadata indicating a risk dimension, based on the presence or absence of keywords, based on the source from which the report is obtained, and the like. Reports may be obtained based on relevance, which is indicated according to device catalog 108; for example, in some embodiments, planning module 126 may obtain, categorize, and/or otherwise process reports that relate to software, hardware, and/or firmware of network devices 102A-120N as indicated by device catalog 108.

Planning module 126 analyzes risk reports that are associated with network devices 102A-102N in order to assess risk for individual devices and/or groups of devices. Planning module 126 may utilize conventional or other machine learning in order to determine risk values based on risk reports. In some embodiments, planning module 126 includes a trained regression model that utilizes a deep learning neural network. The regression model may be trained using input data that includes multi-dimensional examples of risk reports for network devices, which are labeled with corresponding risk values for those devices, and which may also be specific to the role of each device. The risk values can be user-assessed and can be provided by administrators, subject matter experts, or other users. Thus, risk analysis can be tailored to a particular organization, such as the organization associated with customer network 110, by training the model using ratings of risk that accurately reflect how the organization would prefer for risk to be assessed. For example, a number of risk reports that might individually appear to be low-risk but are all tied to a particular device that serves a critical role in customer network 110 (e.g., a router) may be user-scored as being associated with a high risk value; accordingly, a model trained on such examples would score risk reports associated with a same model of device deployed in a same (or similar) role more highly to reflect the level of risk reported by the evaluators. The regression model of planning module 126 is depicted and described in further detail with respect to FIGS. 4 and 5.

The risk scores that are computed by planning module 126 can be presented to a user to enable the user to plan an approach to risk remediation. In particular, risk scores may be computed based on risk reports that describe current or outstanding issues (e.g., unmitigated issues) that relate to any of network devices 102A-102N. A user can plan how to mitigate risk by providing a selection of issues or actions to planning module 126 in order to see how mitigating those issues would affect a network's risk scores. Planning module 126 may then identify the risk reports that correspond to the selected issues or actions, and generate updated risk scores for each dimension of risk that are based on a set of risk reports that corresponds to the current or outstanding issues, with the risk reports relating to the user's selected issues or actions being omitted. Thus, a user can see how risk scores for each dimension of risk would change in response to performing selected actions that would cause particular risk reports to no longer be relevant to a network (and therefore no longer included in risk score calculations). Current and/or predicted risk scores can be provided by planning module 126 to user interface module 134 for presentation to a user.

Semantic processing module 128 enables network risk to be interpreted by processing risk reports to extract entities, which can include details of features in a risk report that are relevant to a network. In particular, semantic processing module 128 can process risk reports using a trained semantic analysis model to identify names of network devices and corresponding features or specification features for each identified network device. Based on the frequency of network devices and their features being mentioned in risk reports, semantic processing module 128 can generate reports, including visualizations such as bar graphs, to capture trends in network risk, such as common sources of risk. Thus, semantic processing module 128 can identify particular aspects of a customer network that should be prioritized during risk remediation. The trained semantic analysis model of semantic processing module 128 is depicted and described in further detail with respect to FIGS. 4 and 5.

Risk interpretation module 130 enables network risk to be interpreted by processing risk reports to classify each risk report to classify risk reports in terms of particular dimensions of risk, and to determine a severity of risk associated with each risk report. Thus, risk interpretation module 130 can process a set of risk reports to classify each report into a dimension of risk, such as a best practices dimension, a security advisories dimension, a field notices dimension, a software end-of-life dimension, and a hardware end-of-life dimension. In addition, risk interpretation module 130 assigns a value to each classified risk report that corresponds to a severity of risk. For example, lower numerical values may be associated with less risk, and higher numerical values may be associated with a greater degree of risk. Risk values can be normalized across different dimensions of risk, enabling a severity of risk to be assessed and compared between one dimension and another. Based on the determined severities of risk, risk interpretation module 130 can generate reports, such as heatmaps, that show the various parts of a network that are affected by risk according to the various dimensions of risk that are being assessed. The reports can be provided to user interface module 134 for presentation to a user at a remote computing device.

In some embodiments, risk interpretation module 130 employs a trained machine learning model such as a Bidirectional Encoder Representations from Transformers (BERT) model to read text inputs and produce predictions (i.e., classifications of risk dimensions and severity levels of risk) for risk reports. A BERT model that may be employed by risk interpretation module 130 is depicted and described in further detail with respect to FIG. 11.

Risk mitigation module 132 generates suggestions that include actions that a user, such as a network administrator, can perform to mitigate risk in a network. The actions may include natural language instructions that are generated by one or more machine learning models. Actions suggested by risk mitigation module 132 can include suggestions to replace network devices with other network devices, make software changes to network devices, make hardware changes to network devices, modify the configurations of network devices, and the like. Given a text description of issues or warmings, which can be obtained from risk reports, risk mitigation module 132 may encode the natural language descriptions into a machine-understandable format that can be used to infer problem symptoms, causes, troubleshooting activities, and resolution actions. In some embodiments, risk mitigation module 132 employs a generative adversarial network (GAN) for generating natural language suggestions for actions to mitigate risk. The GAN model of risk mitigation module 132 is depicted and described in further detail with respect to FIGS. 13 and 14.

User interface module 134 may present data to a user including text-based and/or graphical interpretations of a network's risk to enable planning for risk mitigation and/or to indicate actions that can be performed to mitigate risk. In particular, user interface module 134 may receive data that is output by planning module 126, semantic processing module 128, risk interpretation module 130, and/or risk mitigation module 132 and may convert the data into a form that is presentable to a user to better explain network risk. For example, user interface module 134 may generate pie charts showing each dimension of risk's contribution toward total risk of a network based on output of planning module 126, bar charts based on the output of semantic processing module 128, heatmaps based on the output of risk interpretation module 130, and the like. User interface module 134 may also receive input from a user and pass the input to other modules of risk remediation server 118, including user selections for planning risk mitigation, and the like. User interface module 134 may present data locally to a user of risk remediation server 118 and/or may transmit the data for presentation to a user of a network device, such as any of network devices 102A-102N.

Database 136 may include any non-volatile storage media known in the art. For example, database 136 can be implemented with a tape library, optical library, one or more independent hard disk drives, or multiple hard disk drives in a redundant array of independent disks (RAID). Similarly, data in database 136 may conform to any suitable storage architecture known in the art, such as a file, a relational database, an object-oriented database, and/or one or more tables. Database 136 may store data that includes training data for machine learning models, trained machine learning models, risk report data, and any other data relating to risk mitigation.

Network 138 may include a local area network (LAN), a wide area network (WAN) such as the Internet, or a combination of the two, and includes wired, wireless, or fiber optic connections. In general, network 138 can be any combination of connections and protocols known in the art that will support communications between network devices 102A-102N of customer network 110, security servers 111A-111N, and/or risk remediation server 118 via their respective network interfaces in accordance with the described embodiments.

Figure 2:
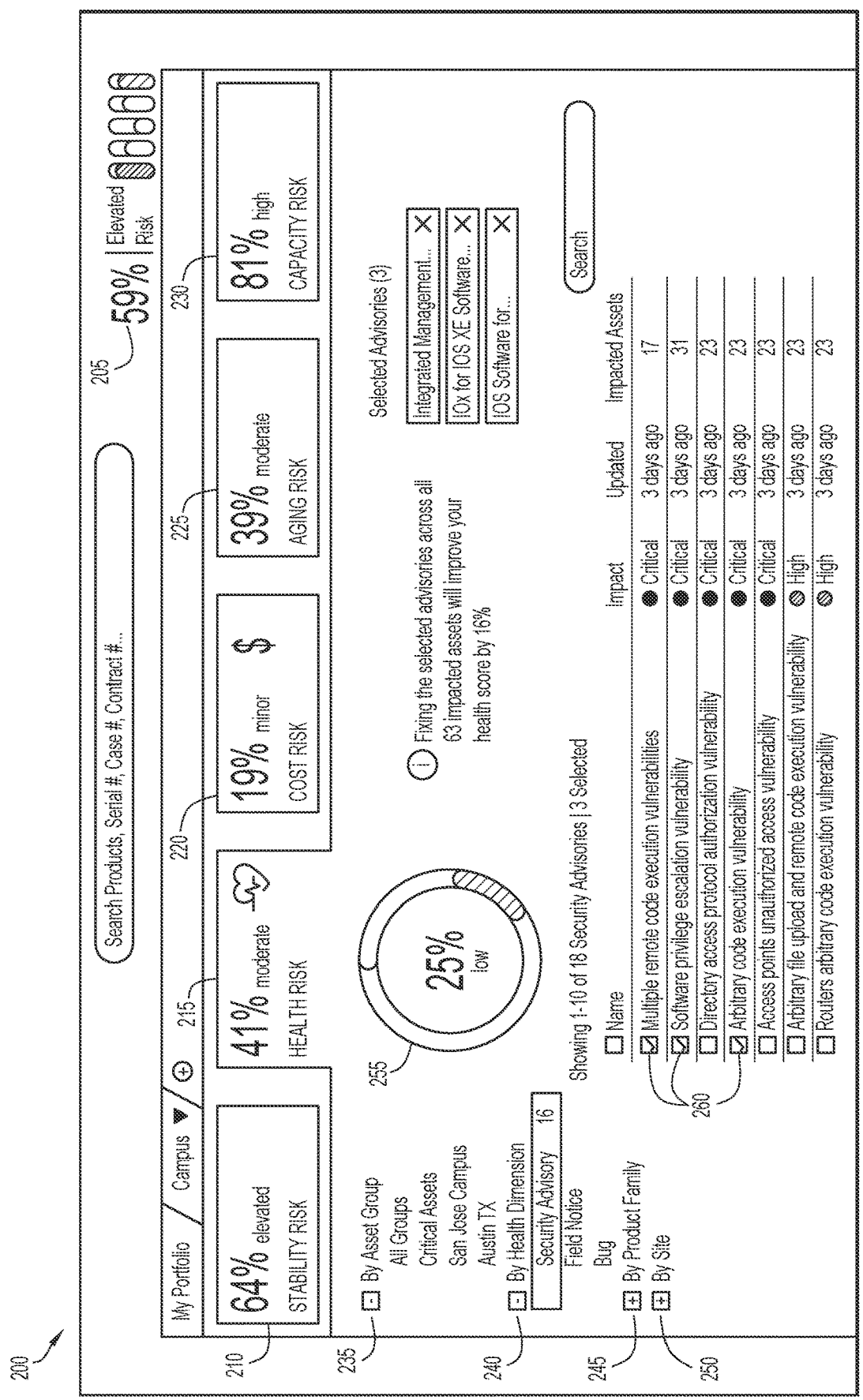
FIG. 2 is a user interface diagram depicting a screen or view for planning the remediation of network risk, in accordance with an example embodiment.

Referring to FIG. 2, a user interface diagram is shown depicting a screen or view 200 for planning the remediation of network risk in accordance with an example embodiment.

As depicted, screen or view 200 includes several user interface elements relating to risk interpretation and mitigation planning. User interface element 205 indicates a total risk score, which can be a value based on risk scores for each dimension of risk being assessed. User interface elements 210-230 provide feedback relating to various aspects of managing a network. In particular, user interface element 210 indicates a stability risk score, which can describe observed or predicted downtimes or service interruptions for various aspects of a network. User interface element 215 indicates a health risk score, which can describe the risk of network devices in terms of risk reports that relate to those devices. User interface element 220 indicates a cost risk, which may indicate an estimated cost for fixing potential or actual issues in a network. User interface element 225 indicates an aging risk, which may estimate the age of network devices, and therefore, can correspond to a likelihood of hardware failures. User interface element 230 indicates a capacity risk, which can indicate the amount of network resources (e.g., bandwidth resources, processing resources, memory resources, storage resources, etc.) that are consumed at a current time, at a peak time, or during a rolling average of a past span of time, compared to the total available amount of network resources.

User interface elements 235-250 enable a user to view network risk, and plan risk mitigation, based on different aspects of a network. For example, user interface element 235 enables a user to review network risk based on an asset group to which the network devices are assigned. Asset groups can include roles, (e.g., a college campus), a level of criticality (e.g., critical assets), and the like. User interface element 240 enables a user to review risk by dimension of risk, such as a security advisories dimension, a field notices dimension, and a bug reports dimension. User interface element 245 enables a user to review network risk based on a product family, such as network devices belonging to a same manufacturer or otherwise associated or bundled with each other. User interface element 250 enables a user to review network risk based on a site, such as a particular geographical location, a particular building, a floor of a building, and the like.

As shown, the security advisories sub-dimension has been selected, causing network screen or view 200 to display information relating to the security advisories dimension of risk. User interface element 255 indicates a level of risk for the assessed dimension that is predicted to be attained if certain actions are taken. User interface elements 260 indicate selected actions that, if carried out, would affect the predicted risk score shown in user interface element 255. In the depicted example, three actions are selected, and present embodiments estimate that performing those actions would result in a predicted risk score of 25% for the security advisory dimension of risk.

Figure 3:
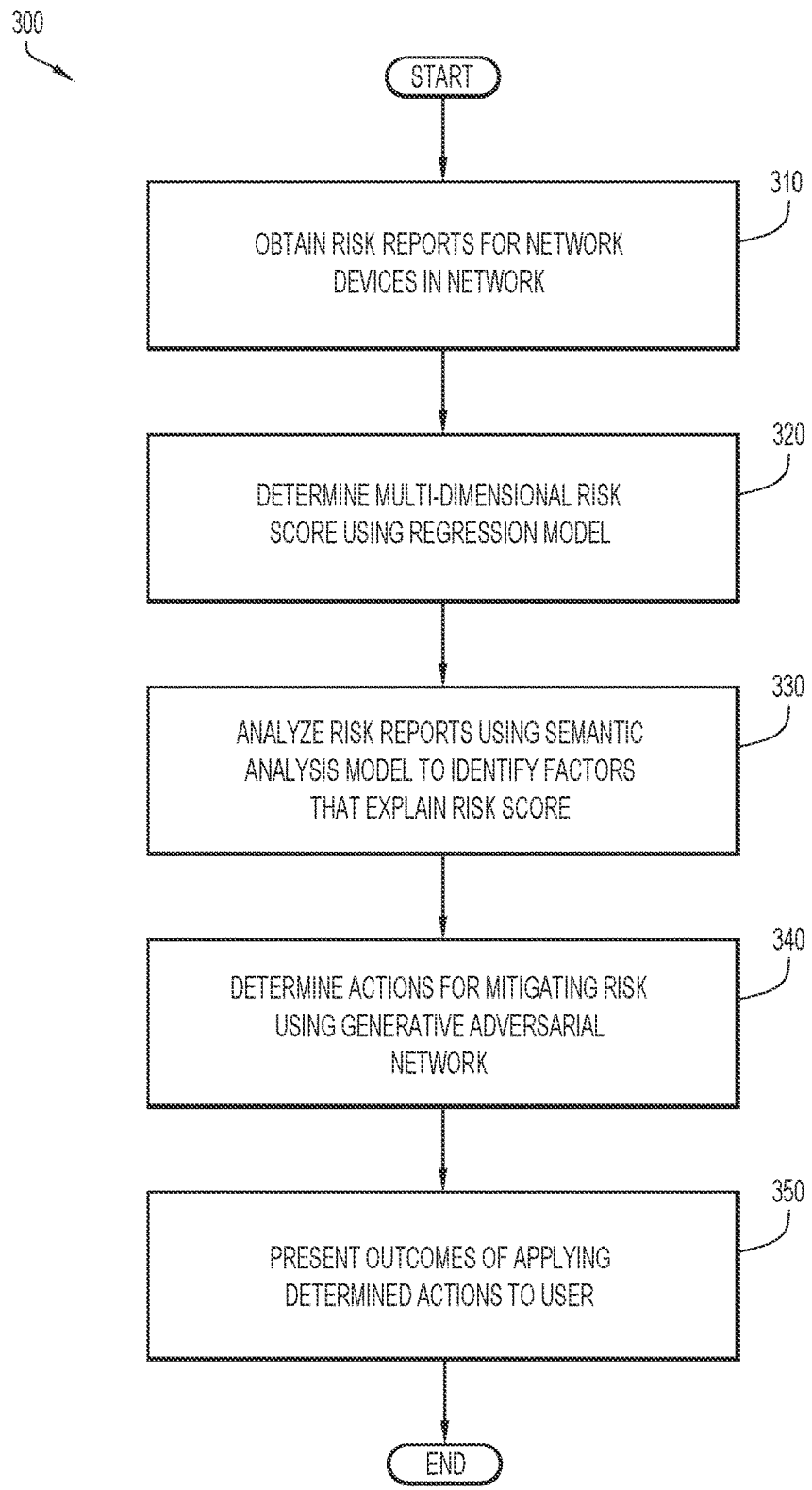
FIG. 3 is a flow chart depicting a method for network risk remediation using machine learning models, in accordance with an example embodiment.

FIG. 3 illustrates a flow chart depicting a method 300 for network risk remediation using machine learning models, in accordance with an example embodiment. Reference is also made to FIG. 1 for purposes of the description of FIG. 3.

Risk reports relating to network devices of a network are received at operation 310. Risk reports can include any document that is relevant to network risk, such as publications by manufacturers of network devices, publications by security researchers, internal memoranda, and the like. Risk reports can be categorized according to one or more dimensions of risk, such as a best practices dimension, a security advisories dimension, a field notices dimension, a software end-of-life dimension, and a hardware end-of-life dimension. For example, a publication from a software manufacturer indicating that the software manufacturer will no longer provide updates for a particular operating system may be classified under a software end-of-life dimension.

A multi-dimensional risk score is determined using a regression model at operation 320. The multi-dimensional risk score may be determined using a machine learning model, such as a deep regression model, that is trained using a training corpus of risk reports for the various desired dimensions of risk that are labeled with values that indicate the severity of risk associated with each risk report. The training corpus of risk reports can be labeled by subject matter experts who provide a numerical value to quantify the risk associated with each risk report. The values that are used to label risk reports can reflect a particular organization's approach to risk, as different values can be chosen based on subjective evaluations of risk. For example, an organization may desire to never have out-of-date software in their network, and so all software end-of-life risk reports may be labeled with a relatively high value to indicate a substantial amount of risk.

The risk reports are analyzed using a semantic analysis model to identify factors that explain the risk score at operation 330. In some embodiments, the semantic analysis model includes a convolutional neural network that is trained to extract names of network devices, and their corresponding specification features, from risk reports. The extracted names may include any identifier for a device, such as a product name, internal name (e.g., nickname), or other unique identifier that specifies a particular network device. Thus, risk reports can be processed to automatically determine counts of the particular types of network devices, and their corresponding features, that are mentioned in risk reports, which can be used to inform users as to the specific sources of risk in a network. Thus, the semantic analysis model may identify trends in risk, which can be helpful during risk mitigation as the most frequent and/or severe sources of risk can be targeted first for mitigation.

In some embodiments, the semantic analysis model includes a BERT and classifier model that analyzes risk reports to determine a severity and category for each risk report, as the risk reports that are processed by the BERT and classifier model may not include labels with respect to either the severity or category of risk. The BERT and classifier model may include two separate mechanisms: an encoder for reading text inputs, and a decoder for predicting the severity and category of risk reports. The output of the BERT and classifier model can be used to interpret risk by indicating which dimensions of risk report are associated with the highest amount of risk, which can be used to prioritize those dimensions during risk mitigation.

Actions for mitigating risk in the network are determined using a generative adversarial network (GAN) model at operation 340. The generative adversarial model may encode natural language descriptions of issues described in risk reports into machine-understandable formats (e.g., vector representations), which can be processed and decoded into natural language instructions that include actions that a user can perform to mitigate risk. These natural language action descriptions can be provided to a user, who can execute the instructions.

In some embodiments, the GAN model outputs executable instructions that can be performed automatically at one or more network devices 102A-102N to cause risk to be mitigated. For example, the GAN model may provide network devices 102A-102N with code that, when executed, modifies a software configuration of a device, causes a device to obtain and install software, and the like. In some embodiments, the executable instructions are automatically performed at a network device by generating an executable file at risk remediation server 118 that is automatically provided to the network device to cause the instructions to be executed by the device. In some embodiments, the executable instructions are automatically performed at a network device by transmitting a notification to the network device that the executable instructions are available; the network device may then retrieve the instructions output by the GAN model and automatically execute the instructions. Executable instructions can be automatically executed at a selected network device using any suitable network protocol for accessing a device to remotely execute commands, such as telnet, Secure Shell Protocol (SSH), and the like.

The outcomes of applying the determined actions are presented to a user at operation 350. A user can review the outcomes of applying various determined actions, which can be presented by indicating the effect that each action would have on a risk score of a network. In some embodiments, a user can select various actions or combinations of actions to see how those actions would impact the risk score of a network. The predicted change to a risk score can be determined by planning module 126, which calculates an updated risk score that omits risk reports that would no longer be relevant if the selected actions were to be performed. For example, if an action indicates that there is a specific security issue in an application that is addressed in an update, a risk report suggesting to update that application would be omitted from consideration when the updated risk score is calculated. Thus, a user can readily review the effect that applying various risk remediation actions would have on risk to the network.

Figure 4:
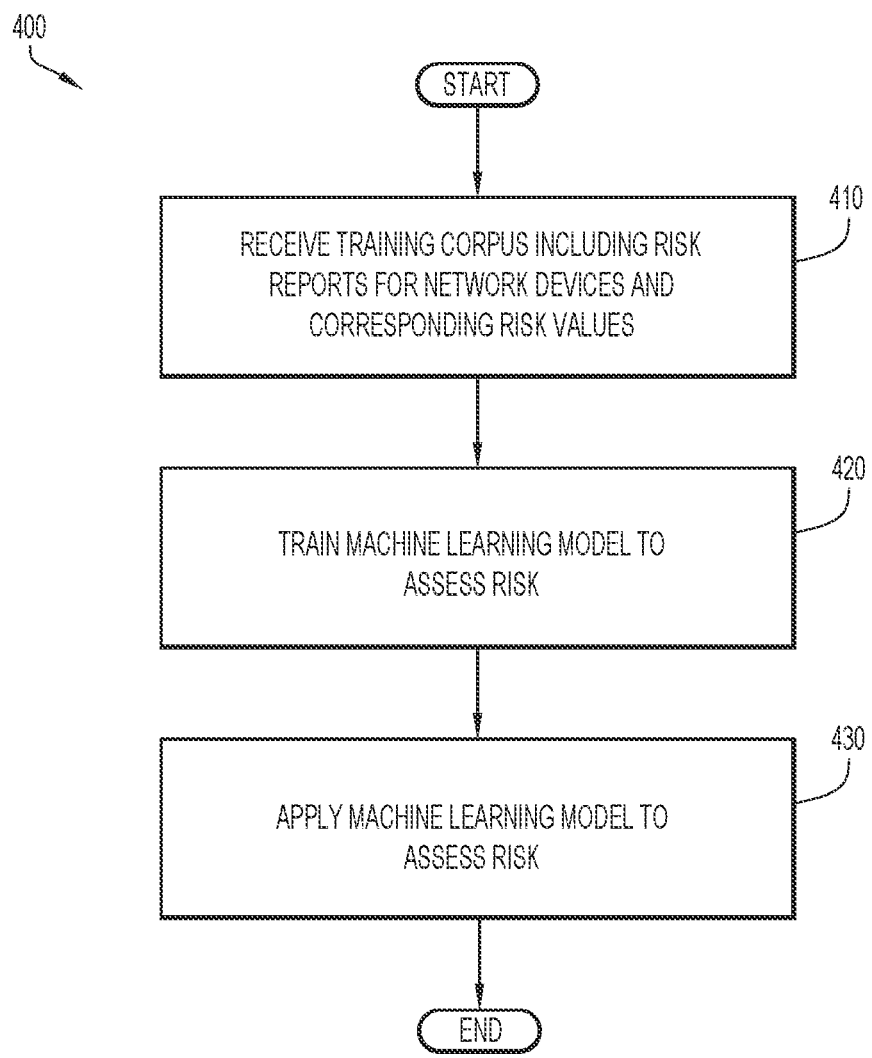
FIG. 4 is a flow chart depicting a method for training a risk assessment model, in accordance with an example embodiment.

Referring to FIG. 4, a flow chart is shown depicting a method 400 for training a risk assessment model, in accordance with an example embodiment. Reference is also made to FIG. 1 for purposes of the description of FIG. 3.

A training corpus of risk report counts for each network device and corresponding risk values is received at operation 410. For instance, one example in a set of training data may include a number of best practices reports, a number of security advisories, a number of field notices, a number of software end-of-life reports, and a number of hardware end-of-life reports, along with the role of the device and the user-provided risk value for the device. The severity of each risk report can also be included; for example, counts may be independently performed on the basis of both dimension of risk and severity.

A machine learning model is trained to assess risk at operation 420. The machine learning model may include a deep regression model that utilizes two hidden layers with sixty-four units each, and ends with a single unit that uses scalar regression to predict a single continuous value representing a risk score. During training, a loss function, such as a mean square error function, is employed in order to calculate model error and to optimize the neural network accordingly. An evaluation matrix, such as a mean absolute error matrix, can determine the difference between predicted risk scores and target risk scores (e.g., the labeled scores of the training corpus). Thus, the resulting model will be able to output estimates of risk for one or more of the network devices 102A-102N based on the role of the device and the count of risk reports per dimension of risk that are associated with the device.

The machine learning model is applied to assess risk at operation 430. The trained deep regression model can analyze a set of risk reports corresponding to devices that are currently employed in a network to determine risk values for each network device, which can be further used to determine an overall multidimensional risk score that indicates risk for each dimension of risk being assessed for the network. In particular, risk values for individual devices for a dimension of risk can be added or otherwise combined based on the number of that type of device in a network to determine the risk that that type of device contributes to a network; the combined risk values of devices of different types can similarly be added, averaged, or otherwise combined, to arrive at an overall risk value for a particular dimension of risk. The machine learning model may compute an overall risk value for each dimension of risk, which can be presented as a multidimensional risk score.

Figure 5:
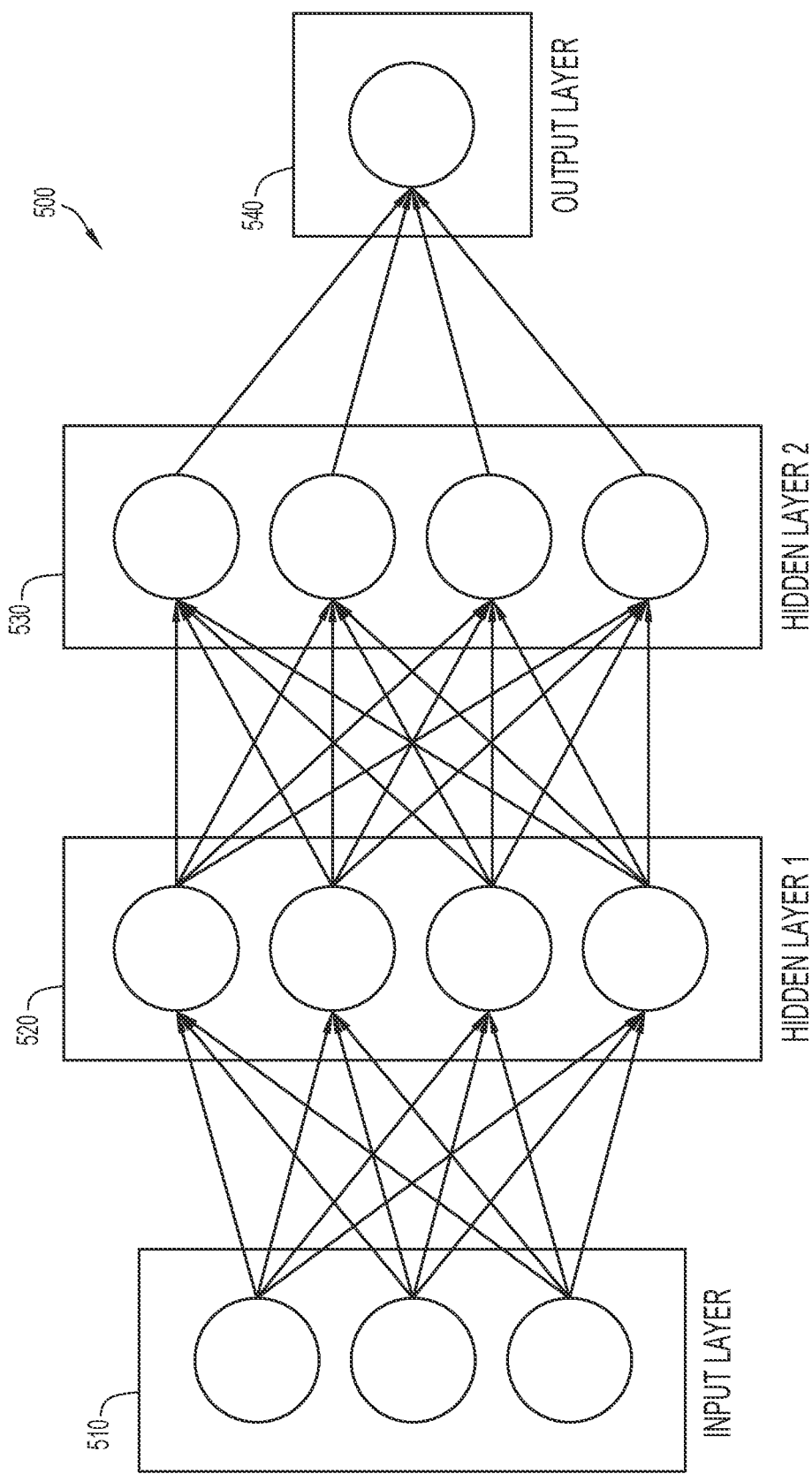
FIG. 5 is a block depicting a deep regression model used in the techniques presented herein, in accordance with an example embodiment.

Referring to FIG. 5, FIG. 5 is a diagram depicting a deep regression model 500, in accordance with an example embodiment.

As depicted, deep regression model 500 includes an input layer 510, two hidden layers 520 and 530, and an output layer 540. The input layer 510 may be provided with counts of risk reports for each dimension of risk for a network device, which can be presented as an n-dimensional vector. For example, if there is a best practices dimension, a security advisories dimension, a field notices dimension, a software end-of-life dimension, and a hardware end-of-life dimension, then a five-dimensional vector would be provided to deep regression model, with each dimension having values correspond to the count of risk reports for that dimension of risk.

In some embodiments, deep regression model 500 includes two hidden layers 520 and 530, which have sixty-four units each. Deep regression module 500 ends in a single unit at output layer 540, which does not include an activation function, and at which a scalar is outputted that is a continuous value representing risk. In some embodiments, the model is trained using a mean square error loss function, and a mean absolute error evaluation matrix to evaluate the differences between predictions of risk and targets (e.g., the user-provided estimates of risk values).

Figure 6:
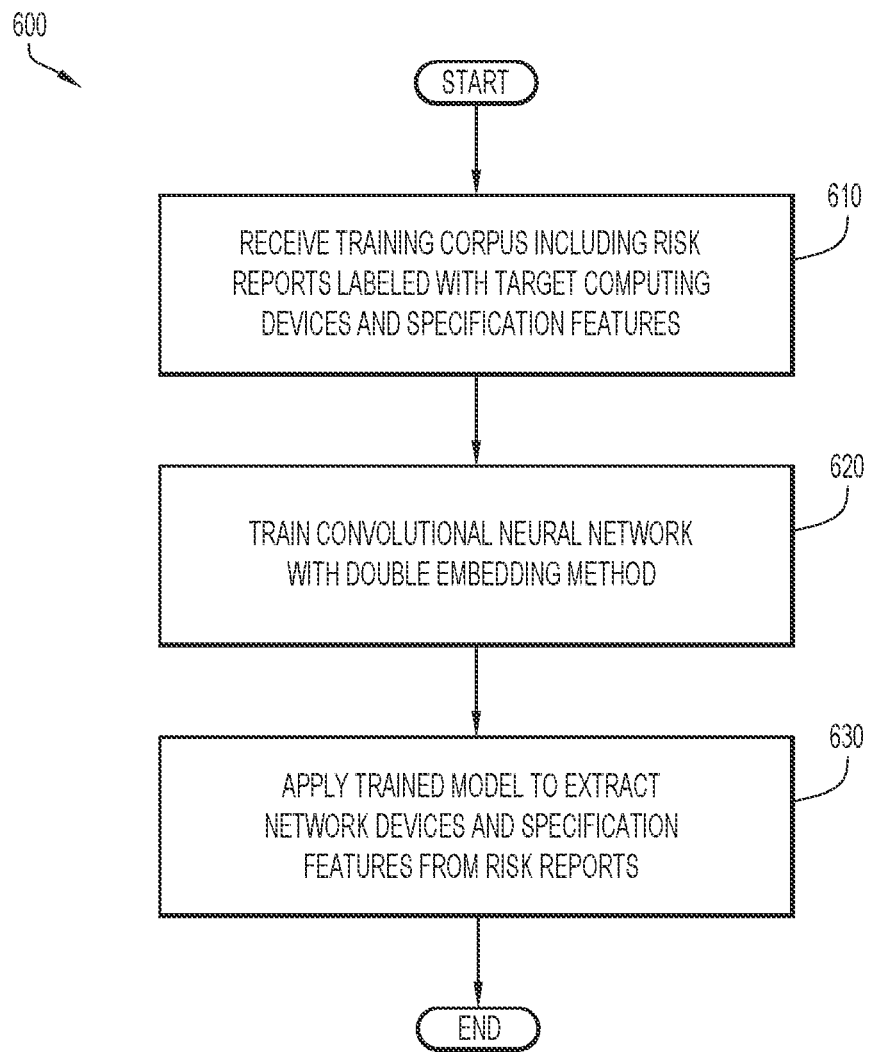
FIG. 6 is a flow chart depicting a method for training and applying a semantic processing model, in accordance with an example embodiment.

FIG. 6 is a flow chart depicting a method 600 for training and applying a semantic processing model, in accordance with an example embodiment.

A training corpus that includes risk reports labeled with target computing devices and corresponding specification features is received at operation 610. The risk reports of the training corpus may include tags indicating portions of text that correspond to particular entities, including network devices, and specification features. For example, a risk report that is included in a training corpus may be manually labeled with tags to indicate that the phrase "router" is a network device, and the phrase "firewall" is a specification feature.

A convolutional neural network is trained using a double embedding method at operation 620. In order to train a convolutional neural network to learn embeddings of words, a double embedding method may be employed in which pre-trained embedding vectors are included from a general language corpus; the general-language embedding vectors are combined (e.g., via concatenation) with pre-trained telecommunication and network domain language embedding vectors to produce doubly-embedded vectors that capture a general language context as well as a network-specific context of words. By training a convolutional neural network using the training corpus and starting with the concatenated vectors produced by merging the pre-trained vectors, a convolutional neural network can be provided that can process risk reports to extract the entities for which the training corpus was labeled (i.e., network devices and specification features).

A trained model is applied to extract network devices and corresponding specification features from risk reports at operation 630. The trained convolutional neural network model can be provided with risk reports that pertain to devices in a network (e.g., network devices 102A-102N in FIG. 1). Extracted network device names and specification features can be used to explain sources of risk. In particular, the more frequently the set of risk reports, which are relevant to devices in a network, mention specific types of network devices and/or specification features, the more likely those types of network devices and/or specification features are responsible for risk in the network.

Figure 7:
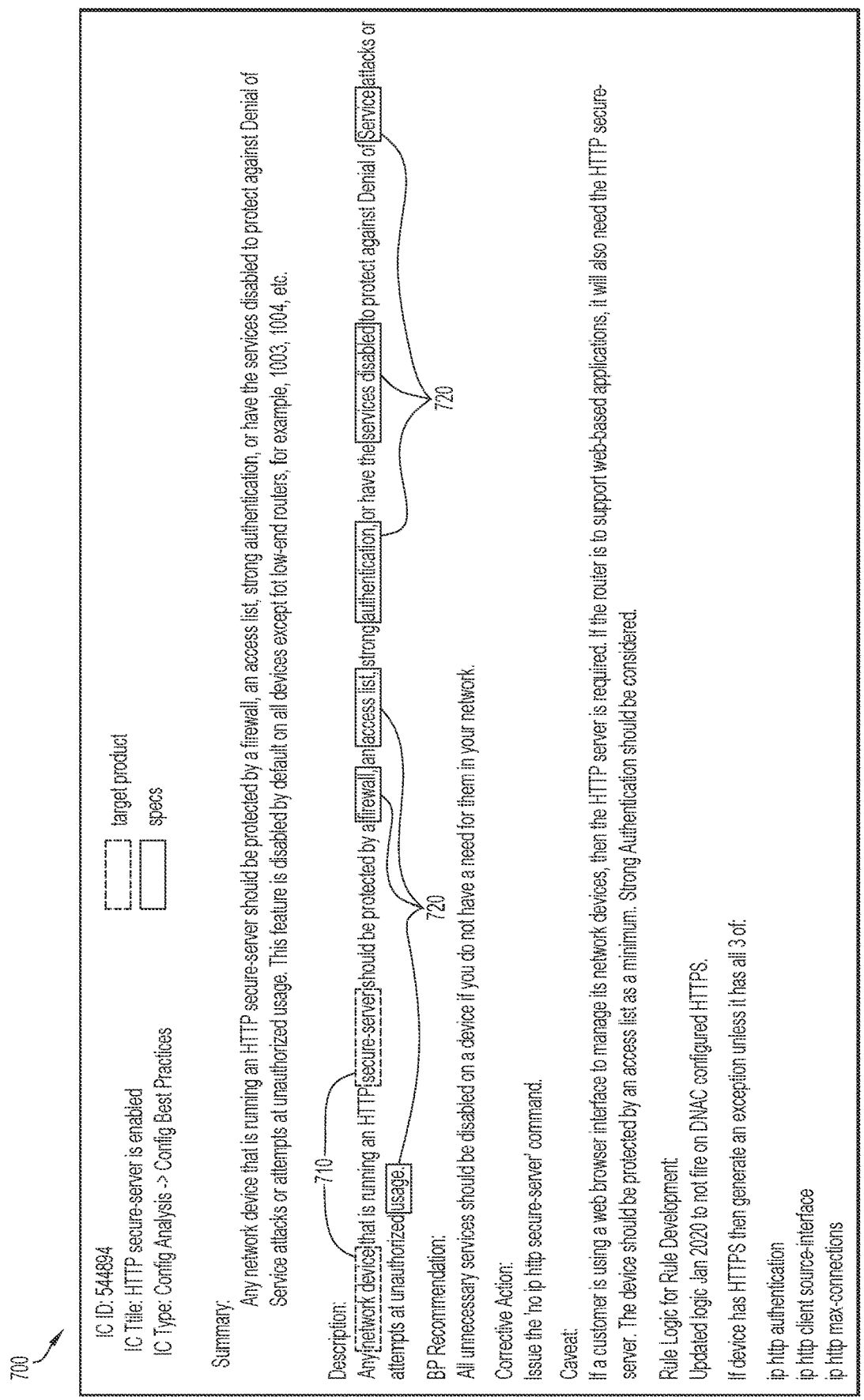
FIG. 7 is a user interface diagram depicting a labeled risk report for training a semantic processing model, in accordance with an example embodiment.

Referring to FIG. 7, FIG. 7 is a user interface diagram depicting a labeled risk report 700 for training a semantic processing model, in accordance with an example embodiment.

As depicted, labeled risk report 700 includes labels for two different types of entities, network devices, and specification features. In the depicted example, labels 710 are applied to network devices ("network device" and "secure-server"), and labels 720 are applied to specification features ("usage," "firewall," "access list," "authentication," "services disabled," and "service"). Thus, labeled risk report 700 may be used, along with other examples of labeled risk reports corresponding to each dimension of risk, to train a convolutional neural network model for extracting entities from risk reports.

Figure 8:
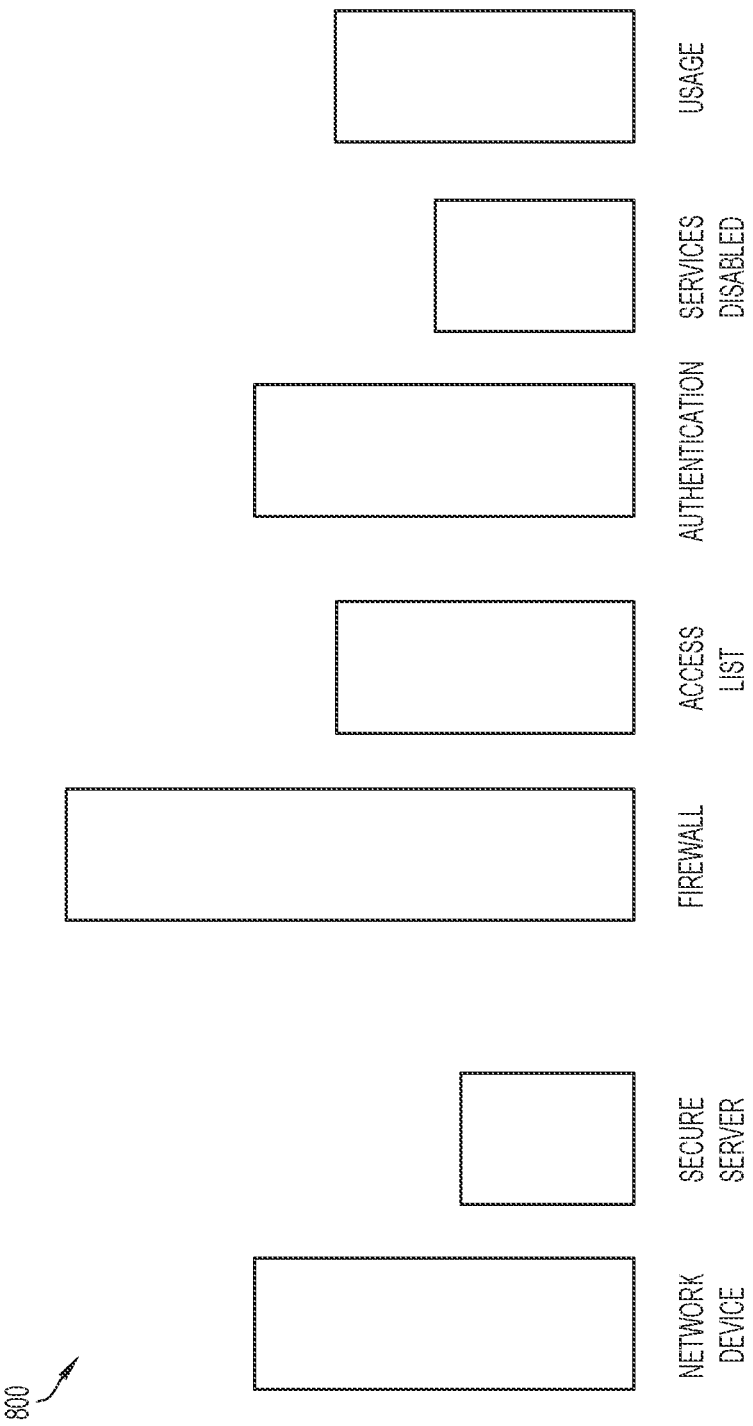
FIG. 8 is a bar chart depicting counts of extracted entities from a set of risk reports, in accordance with an example embodiment.

FIG. 8 is a bar chart 800 depicting counts of extracted entities from a set of risk reports, in accordance with an example embodiment. As shown, bar chart 800 depicts counts for two network device types ("network device" and "secure-server") and five specification features ("usage," "firewall," "access list," "authentication," "services disabled," and "service"). The magnitude of the bar for each entity may correspond to a number of times that entity was extracted from a set of risk reports. Thus, in the depicted example, the specification feature of "firewall" was mentioned approximately twice as much as the specification feature of "access list," indicating that issues pertaining to one or more firewalls may pose approximately twice as much risk to a network as issues pertaining to access lists.

Figure 9:
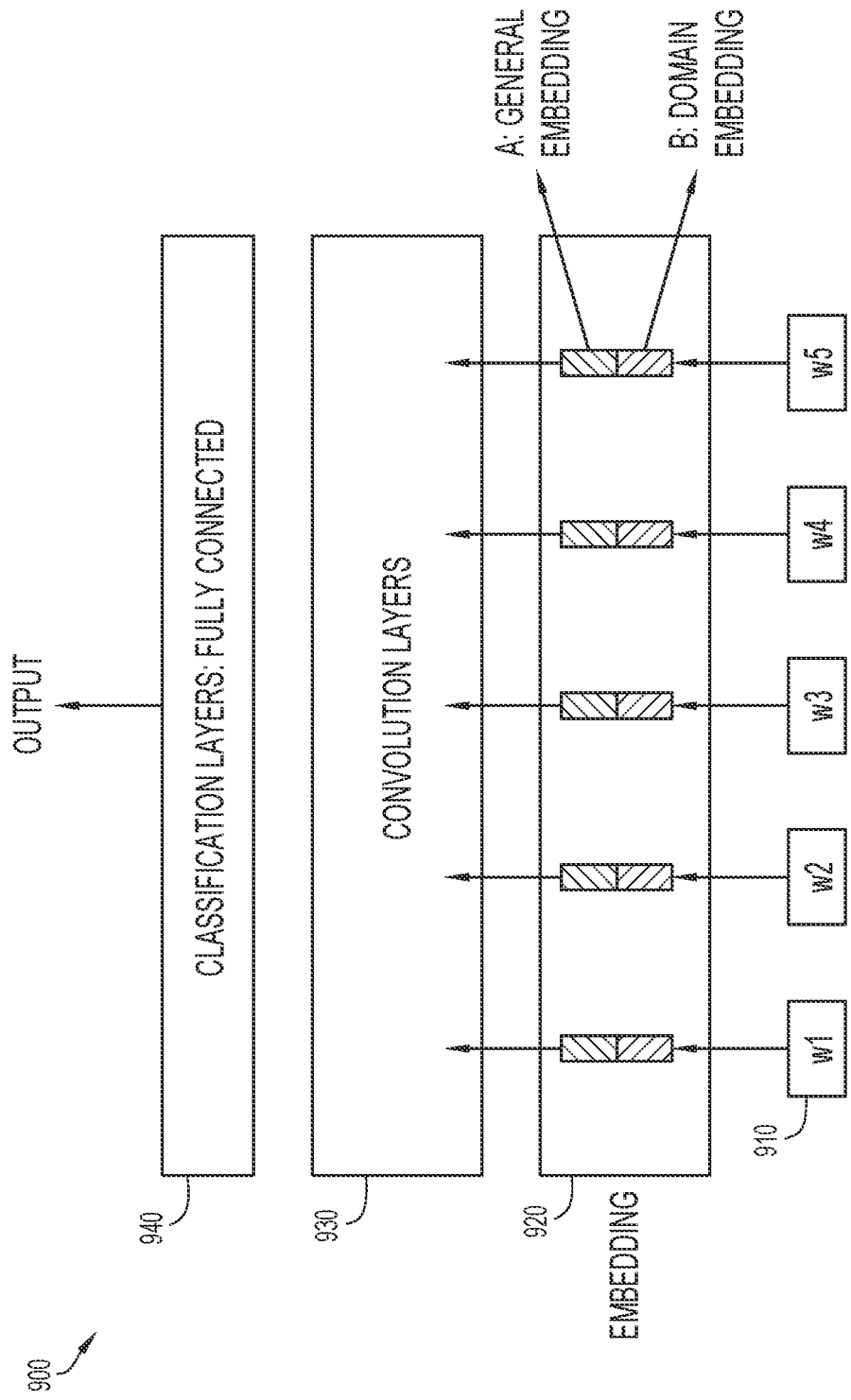
FIG. 9 is a block diagram depicting a double embedding convolutional model used in the techniques presented herein, in accordance with an example embodiment.

FIG. 9 is a block diagram depicting a double embedding convolutional model 900, in accordance with an example embodiment.

As depicted, words 910 of a risk report (represented as w1, w2, w3, w4, and w5) are provided to double embedding convolutional model 900. Embeddings 920 are determined for each of these words using word embedding vectors that are produced as a result of concatenating general-language embedding vectors and telecommunication and network domain language embedding vectors. The specific embedding vector for each word is passed to convolutional layers 930 until a fully-connected layer 940 is attained with outputs that include the specific entities that are being extracted from a risk report (e.g., network device types and specification features.)

Figure 10:
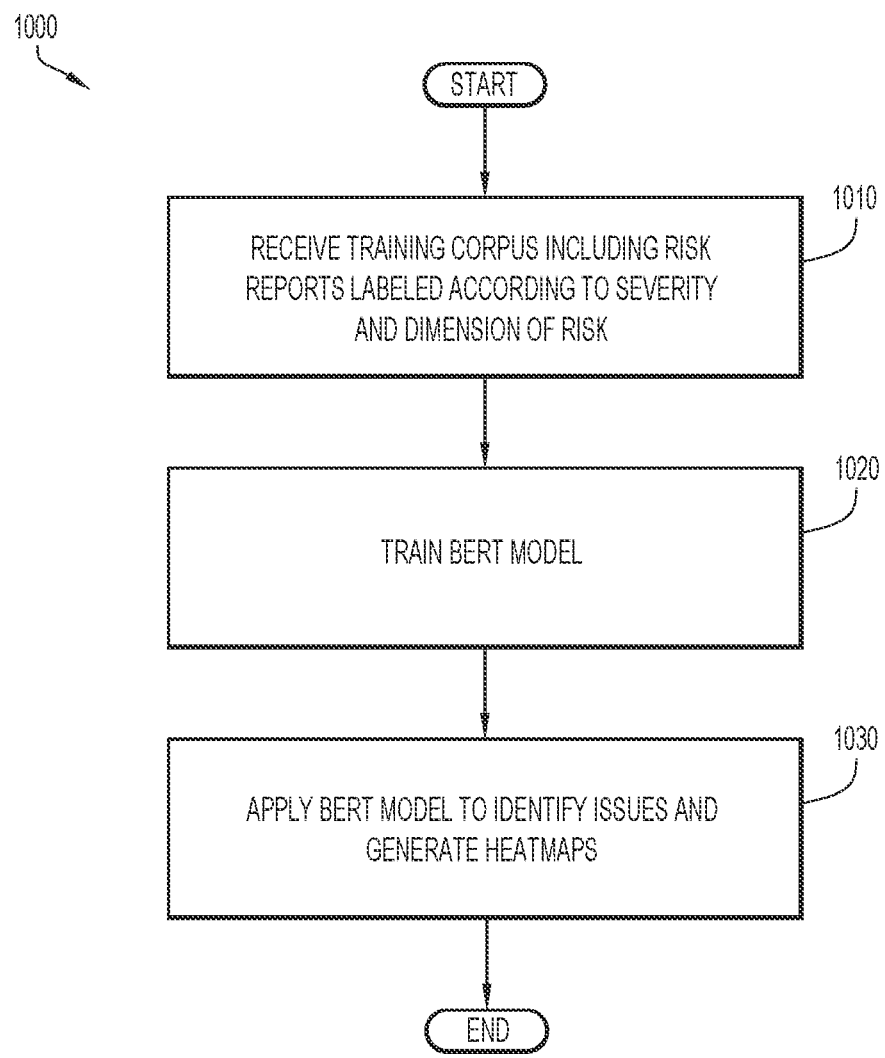
FIG. 10 is a flow chart depicting a method for training and applying a bidirectional encoder representations from transformers and classification model, in accordance with an example embodiment.

Referring to FIG. 10, FIG. 10 is a flow chart depicting a method 1000 for training and applying a BERT and classification model, in accordance with an example embodiment.

A training corpus that includes risk reports labeled with respect to a severity and dimension of risk is received at operation 1010. The training corpus may thus include a set of data containing risk warning descriptions, such as "On a produc_1 chassis, all ports may go down at run time due to onboard power brick failure on the Line Card. A reload of the chassis or power cycle may not recover from the failure state if the failure is due to power fault. If a reload does not recover the product_1 from fault, this is a hard failure of the power brick and the product_1 needs to be replaced." The text is labeled with a particular dimension of risk (e.g., a "field notices" dimension, a "hardware end-of-life" dimension, etc.), and a severity of risk (e.g., "1," "2," or "3," for low, medium, and high severity, respectively).

A BERT model is trained at operation 1020. The BERT model is trained using the examples of the training corpus to process natural language warning descriptions, such as those included in risk reports, to determine a dimension of risk and a severity of risk for each input block of text.

The BERT model is applied to identify issues and generate heatmaps at operation 1030. Once trained, the BERT model can process risk reports for network devices to determine the dimension of risk to which each risk report should be assigned, and the severity of risk associated with each risk report. Thus, the output of a BERT model can be used to identify key areas of a network that are contributing toward the network's risk in particular. Based on the identified dimension of risk and severity of risk for a group of risk reports, a heatmap can be constructed that provides a user with a visual representation of sources of risk in a network.

Figure 11:
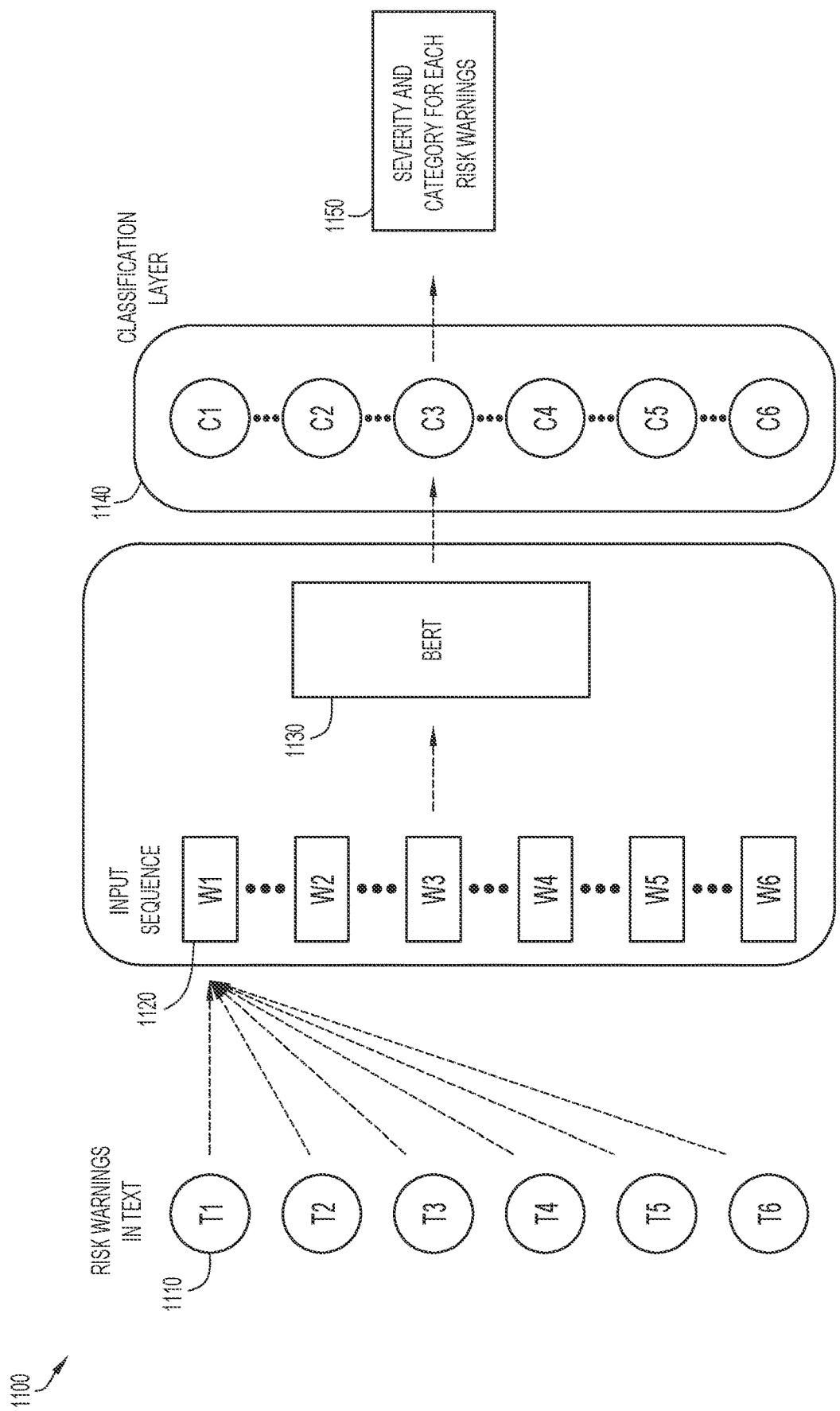
FIG. 11 is a block diagram depicting a bidirectional encoder representations from transformers model, in accordance with an example embodiment.

FIG. 11 is a block diagram depicting BERT model 1100, in accordance with an example embodiment.

As depicted, the text 1110 of risk reports is provided to BERT model 1100. The text 1110 is encoded as input sequences 1120 for training the BERT encoder 1130. The text 1110 thus functions as a training set, and includes a set of texts (e.g., T1-T6) of the risk reports, which are converted to word sequences (e.g., W1-W6) that are ordered strings of the words in the risk report in the order in which the words appear. The output of the (trained) BERT encoder 1130 is provided to a final classification layer 1140, which provides an output 1150 that includes a severity and dimension for each risk report.

Referring to FIG. 12, FIG. 12 is a heatmap 1200 diagram depicting contributing factors to risk by category, in accordance with an example embodiment. Heatmap 1200 can be generated based on the severity and dimension of risk for each risk report in a set of risk reports. The risk reports can be separated according to attributes, such as the dimension 1210 of risk report and the role 1220 of the device to which the risk report corresponds. Thus, a two-dimensional grid can be formed that shows relative amounts of risk on a per-dimension and per-role basis for a network. Higher values of risk can be visually indicated using shading or colors in order to draw a user's attention to the portions of a network associated with the greatest amounts of risk.

Figure 13:
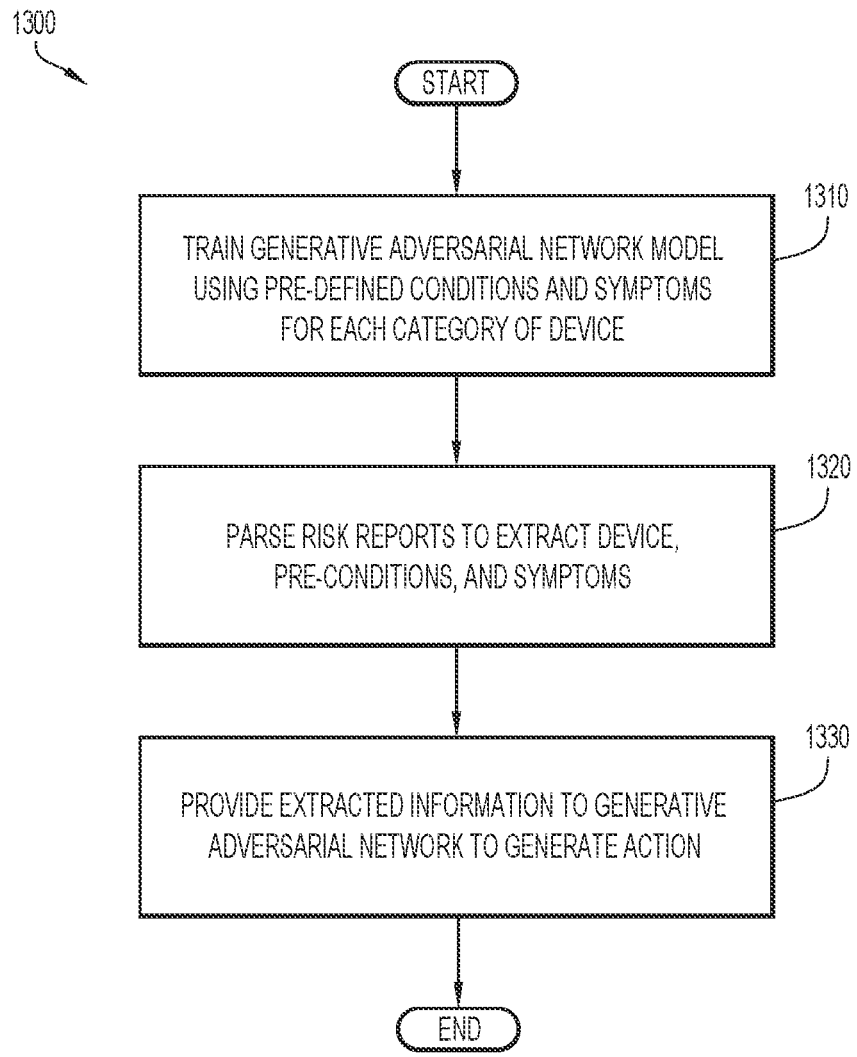
FIG. 13 is a flow chart depicting a method for training and applying a generative adversarial network model, in accordance with an example embodiment.

FIG. 13 is a flow chart depicting a method 1300 for training and applying a GAN model, in accordance with an example embodiment.

A GAN model is trained using pre-defined conditions and symptoms for each category of network device at operation 1310. The GAN may be trained using training data that includes text of risk reports and an ontology or knowledge graph that represents a hierarchical relationship between devices, families of devices, predefined conditions, and symptoms. The ontology may be constructed by subject matter experts, and relationships between devices and/or families of devices and the predefined conditions and symptoms can be defined according to existing knowledge based on past issues. Based on the examples of the training data, the GAN model is trained to generate summaries of actions that are used to address specific causes of risk outlined in risk reports.

The extracted information is provided to the trained GAN model at operation 1330 to generate an action for remediating risk. Risk reports are parsed to extract devices, preconditions, and symptoms from each risk report at operation 1320. An entity level may extract devices, and an inference level may include two layers: a first layer extracts preconditions, and a second layer extracts symptoms. The extracted information is provided to the GAN model, which utilizes the extracted information as input for generating natural language samples that describe actions for mitigating risk. Additionally or alternatively, the GAN model may output computer-executable instructions that, when executed by particular network devices, perform actions to mitigate risk.

Figure 14:
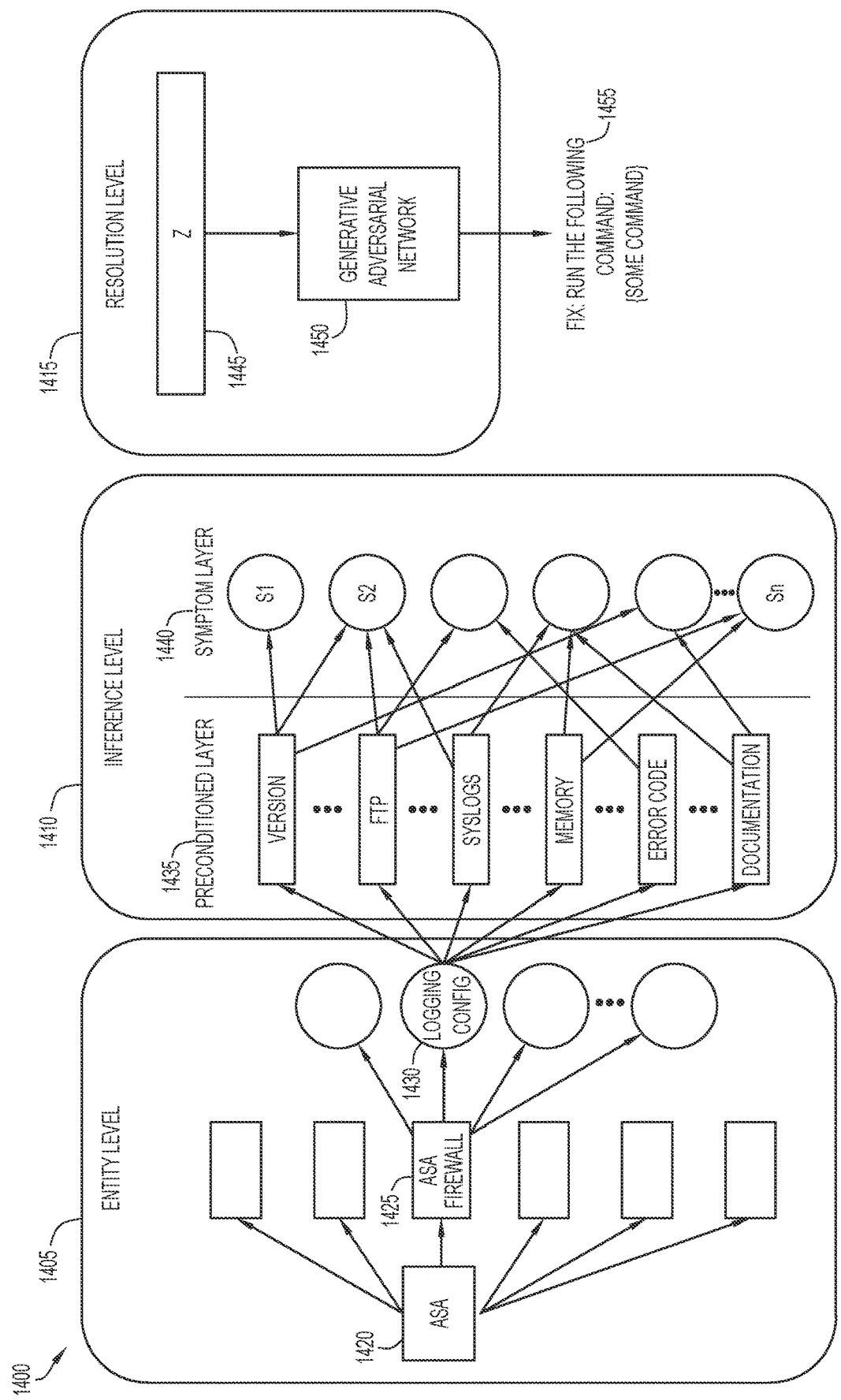
FIG. 14 is a diagram depicting a risk mitigation model, in accordance with an example embodiment.

Referring to FIG. 14, FIG. 14 is a diagram depicting a risk mitigation model 1400, in accordance with an example embodiment.

Risk mitigation model 1400 includes three levels, an entity level 1405, an inference level 1410, and a resolution level 1415. At the entity level 1405, a topic entity 1420 can be provided, which may include any product at risk (e.g., a network device for which risk reports have been received). Using the provided ontology, a product family 1425 can be determined, and related specification features 1430 can likewise be determined. In the depicted example, the product is "ASA," the product family is "ASA firewall," and a specification feature includes "logging config." The input text is parsed to extract "ASA," and the terms "ASA firewall" and "logging config" are determined to be related to "ASA" according to the predefined ontology.

At inference level 1410, a first layer, precondition layer 1435, includes preconditions, and a second layer, symptom layer 1440, includes symptoms, both of which can be mapped to products and/or product families based on the provided ontology. After parsing a risk report, precondition nodes and matched symptom nodes are activated for computing a conditional probability for each individual symptom ($s_1 \ldots s_n$) given the observed conditions sets (con=[$C_1$, $C_2, \ldots C_n$]). The preconditions may be satisfied based on words or phrases appearing in the input text. Symptom layer 1440 enables GAN model 1450 to learn useful features based on information provided in the previous layers (e.g., the terms indicated by the ontology). The symptoms encodings are arranged as a matrix that is utilized for a (final) input vector 1445 into the GAN model. Input vector 1445 (e.g., vector Z) may be determined according to equation 1:

$$Z = P(S_1|con), \ldots, P(S_n|con) \quad (1)$$

where con=[$C_1, C_2, \ldots C_n$].

Input vector 1445 thus encodes the features that represent a particular issue. GAN model 1450 then processes input vector 1445 to generate natural language actions and/or computer-executable actions 1455 for remediating risk. In various embodiments and depending on the training data provided to GAN model 1450, GAN model 1450 can generate various outputs such as a command, a link to a tutorial or training document, or a sentence from a manual.

Figure 15:
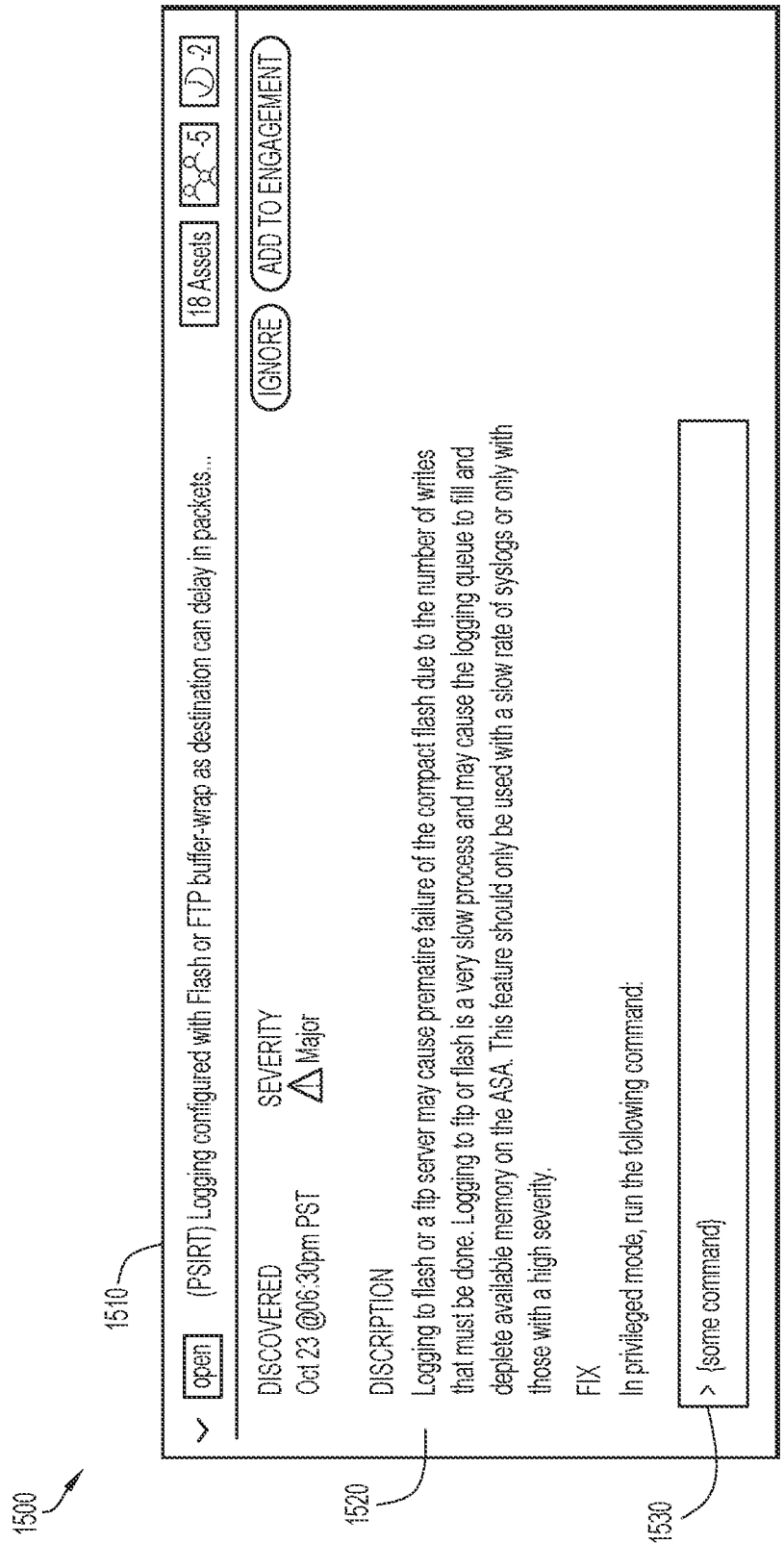
FIG. 15 is a user interface diagram depicting a screen or view of a client application for presenting suggestions for mitigating risk, in accordance with an example embodiment.

Referring to FIG. 15, FIG. 15 is a user interface diagram depicting a screen or view 1500 of a client application for presenting suggestions for mitigating risk, in accordance with an example embodiment. As depicted, screen or view 1500 includes a title 1510, a description 1520, and an action 1530. The title 1510 may briefly summarize a cause of risk and/or a proposed solution, and may additionally indicate a risk dimension. Description 1520 may include a short description of the risk that may be generated by a GAN model. Action 1530, also generated by the GAN model, may include a specific course of action for risk remediation, such as a particular action that can be performed by an administrator, or an executable command that can be automatically performed at a network device.

Figure 16:
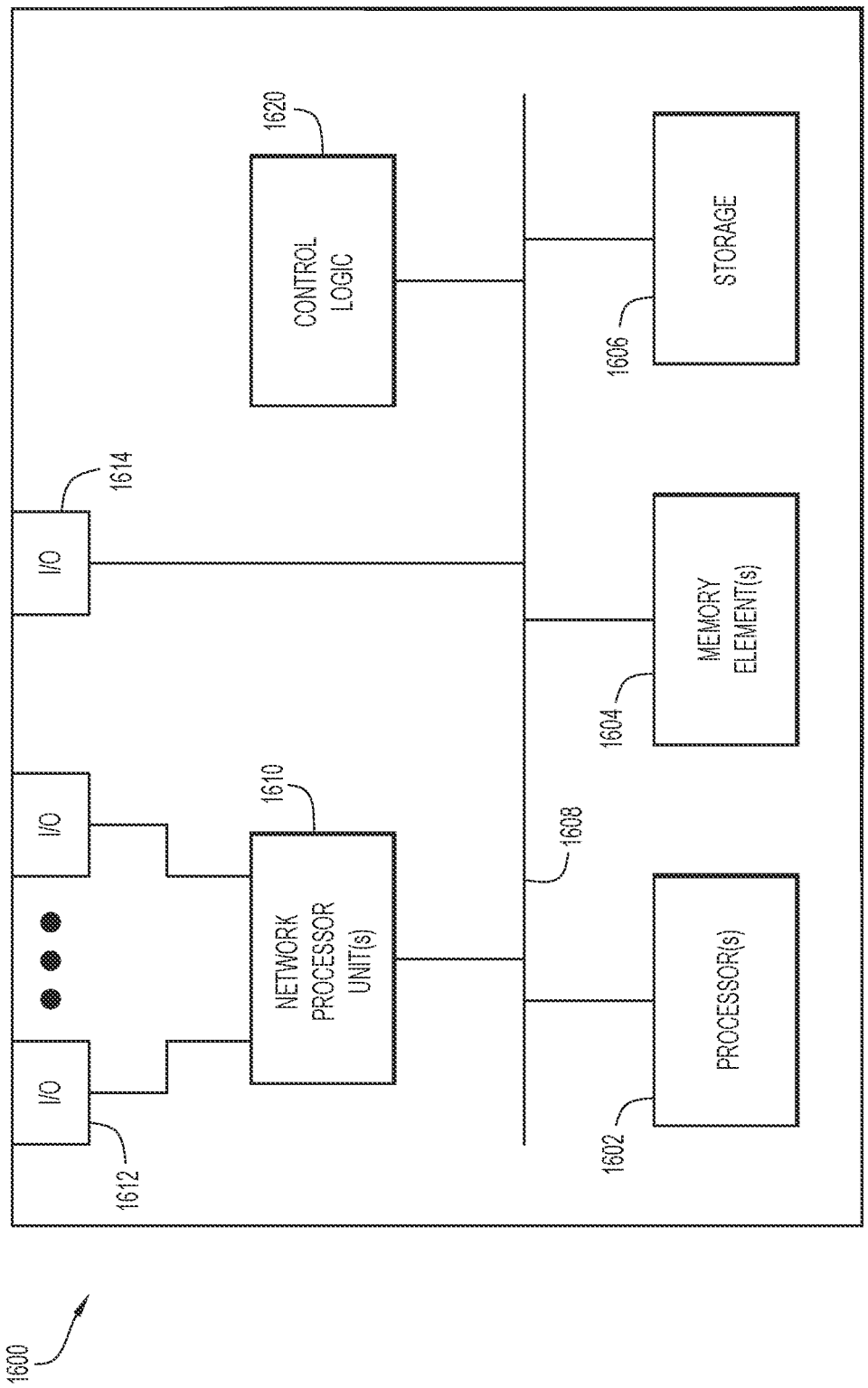
FIG. 16 is a block diagram depicting a computing device configured to interpret and remediate risk, in accordance with an example embodiment.

Referring to FIG. 16, FIG. 16 illustrates a hardware block diagram of a computing device 1600 that may perform functions associated with operations discussed herein in connection with the techniques depicted in FIGS. 1-15. In various embodiments, a computing device, such as computing device 1600 or any combination of computing devices 1600, may be configured as any entity/entities as discussed for the techniques depicted in connection with FIGS. 1-15 in order to perform operations of the various techniques discussed herein.

In at least one embodiment, the computing device 1600 may include one or more processor(s) 1602, one or more memory element(s) 1604, storage 1606, a bus 1608, one or more network processor unit(s) 1610 interconnected with one or more network input/output (I/O) interface(s) 1612, one or more I/O interface(s) 1614, and control logic 1620. In various embodiments, instructions associated with logic for computing device 1600 can overlap in any manner and are not limited to the specific allocation of instructions and/or operations described herein.

In at least one embodiment, processor(s) 1602 is/are at least one hardware processor configured to execute various tasks, operations and/or functions for computing device 1600 as described herein according to software and/or instructions configured for computing device 1600. Processor(s) 1602 (e.g., a hardware processor) can execute any type of instructions associated with data to achieve the operations detailed herein. In one example, processor(s) 1602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1604 and/or storage 1606 is/are configured to store data, information, software, and/or instructions associated with computing device 1600, and/or logic configured for memory element(s) 1604 and/or storage 1606. For example, any logic described herein (e.g., control logic 1620) can, in various embodiments, be stored for computing device 1600 using any combination of memory element(s) 1604 and/or storage 1606. Note that in some embodiments, storage 1606 can be consolidated with memory element(s) 1604 (or vice versa), or can overlap/exist in any other suitable manner.

In at least one embodiment, bus 1608 can be configured as an interface that enables one or more elements of computing device 1600 to communicate in order to exchange information and/or data. Bus 1608 can be implemented with any architecture designed for passing control, data and/or information between processors, memory elements/storage, peripheral devices, and/or any other hardware and/or software components that may be configured for computing device 1600. In at least one embodiment, bus 1608 may be implemented as a fast kernel-hosted interconnect, potentially using shared memory between processes (e.g., logic), which can enable efficient communication paths between the processes.

In various embodiments, network processor unit(s) 1610 may enable communication between computing device 1600 and other systems, entities, etc., via network I/O interface(s) 1612 (wired and/or wireless) to facilitate operations discussed for various embodiments described herein. In various embodiments, network processor unit(s) 1610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1612 can be configured as one or more Ethernet port(s), Fibre Channel ports, any other I/O port(s), and/or antenna(s)/antenna array(s) now known or hereafter developed. Thus, the network processor unit(s) 1610 and/or network I/O interface(s) 1612 may include suitable interfaces for receiving, transmitting, and/or otherwise communicating data and/or information in a network environment.

I/O interface(s) 1614 allow for input and output of data and/or information with other entities that may be connected to computer device 1600. For example, I/O interface(s) 1614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1620 can include instructions that, when executed, cause processor(s) 1602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1604 and/or storage 1606 can store data, software, code, instructions (e.g., processor instructions), logic, parameters, combinations thereof, and/or the like used for operations described herein. This includes memory element(s) 1604 and/or storage 1606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5 G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided comprising: processing a plurality of risk reports corresponding to a plurality of network devices in a network to determine a multidimensional risk score for the network, analyzing the plurality of risk reports using a semantic analysis model to identify one or more factors that contribute to the multidimensional risk score, determining one or more actions using a trained learning model to mitigate one or more dimensions of the multidimensional risk score, and presenting outcomes of applying the one or more actions to a user to indicate an effect of each of the one or more actions on the multidimensional risk score for the network.

In another form, the trained learning model includes a generative adversarial network that determines the one or more actions by processing input comprising an identified network device, and identified conditions and symptoms for a category of the identified network device.

In another form, the trained learning model includes a generative adversarial network, and wherein the one or more actions determined by the generative adversarial network are generated as natural language instructions.

In another form, the method further includes automatically modifying a configuration of a network device of the plurality of network devices based on the outcomes of applying the one or more actions.

In another form, the multidimensional risk score is determined using a regression model that is trained using a training corpus of risk reports labeled with values for each dimension of risk.

In another form, the semantic analysis model comprises a convolutional neural network that extracts names of network devices and associated features for each named networking device from the plurality of risk reports.

In another form, the semantic analysis model includes a bidirectional encoder representation from transformers (BERT) model that analyzes a risk report to determine, for the risk report, a dimension of risk and a severity of risk.

In another form, dimensions of the multidimensional risk score include a best practices dimension, a product security incident response team dimension, a field notices dimension, a hardware end-of-life dimension, and a software end-of-life dimension.

In another form, presenting the effect of each of the one or more actions includes presenting a predicted change in one or more dimensions of the multidimensional risk score for the network In one form, a computer system is provided, comprising: one or more computer processors; one or more computer readable storage media; program instructions stored on the one or more computer readable storage media for execution by at least one of the one or more computer processors, the program instructions comprising instructions to: process a plurality of risk reports corresponding to a plurality of network devices in a network to determine a multidimensional risk score for the network, analyze the plurality of risk reports using a semantic analysis model to identify one or more factors that contribute to the multidimensional risk score, determine one or more actions using a trained learning model to mitigate one or more dimensions of the multidimensional risk score, and present outcomes of applying the one or more actions to a user to indicate an effect of each of the one or more actions on the multidimensional risk score for the network.

In one form, one or more computer readable storage media is provided, the one or more computer readable storage media collectively having program instructions embodied therewith, the program instructions executable by a computer to cause the computer to: process a plurality of risk reports corresponding to a plurality of network devices in a network to determine a multidimensional risk score for the network, analyze the plurality of risk reports using a semantic analysis model to identify one or more factors that contribute to the multidimensional risk score, determine one or more actions using a trained learning model to mitigate one or more dimensions of the multidimensional risk score, and present outcomes of applying the one or more actions to a user to indicate an effect of each of the one or more actions on the multidimensional risk score for the network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   processing a plurality of risk reports corresponding to a plurality of network devices in a network to determine a multidimensional risk score for the network;
   analyzing the plurality of risk reports using a semantic analysis model to identify one or more factors that contribute to the multidimensional risk score;
   determining one or more actions using a trained learning model to mitigate one or more dimensions of the multidimensional risk score, wherein the trained learning model comprises a generative adversarial network that is trained using training data that includes text of risk reports and an ontology that represents a hierarchical relationship between devices, predefined conditions, and symptoms of problems associated with one or more network device of the plurality of network devices; and
   presenting outcomes of applying the one or more actions to a user to indicate an effect of each of the one or more actions on the multidimensional risk score for the network.

2. The computer-implemented method of claim 1, wherein the generative adversarial network determines the one or more actions by processing input comprising an identified network device, and identified conditions and symptoms for a category of the identified network device.

3. The computer-implemented method of claim 1, wherein the one or more actions determined by the generative adversarial network are generated as natural language instructions.

4. The computer-implemented method of claim 1, further comprising:
   automatically modifying a configuration of a network device of the plurality of network devices based on the outcomes of applying the one or more actions.

5. The computer-implemented method of claim 1, wherein the multidimensional risk score is determined using a regression model that is trained using a training corpus of risk reports labeled with values for each dimension of risk.

6. The computer-implemented method of claim 1, wherein the semantic analysis model comprises a convolutional neural network that extracts names of network devices and associated features for each named network device from the plurality of risk reports.

7. The computer-implemented method of claim 1, wherein the semantic analysis model includes a bidirectional encoder representation from transformers (BERT) model that analyzes a risk report to determine, for the risk report, a dimension of risk and a severity of risk.

8. The computer-implemented method of claim 1, wherein dimensions of the multidimensional risk score include a best practices dimension, a product security incident response team dimension, a field notices dimension, a hardware end-of-life dimension, and a software end-of-life dimension.

9. The computer-implemented method of claim 1, wherein presenting the effect of each of the one or more actions includes presenting a predicted change in one or more dimensions of the multidimensional risk score for the network.

10. An apparatus comprising:
    one or more computer processors;
    a network interface configured to enable network communications;
    one or more computer readable storage media; and
    program instructions stored on the one or more computer readable storage media for execution by at least one of the one or more computer processors, the program instructions comprising instructions to:
    process a plurality of risk reports corresponding to a plurality of network devices in a network to determine a multidimensional risk score for the network;
    analyze the plurality of risk reports using a semantic analysis model to identify one or more factors that contribute to the multidimensional risk score;
    determine one or more actions using a trained learning model to mitigate one or more dimensions of the multidimensional risk score, wherein the trained learning model comprises a generative adversarial network that is trained using training data that includes text of risk reports and an ontology that represents a hierarchical relationship between devices, predefined conditions, and symptoms of problems associated with one or more network device of the plurality of network devices; and
    present outcomes of applying the one or more actions to a user to indicate an effect of each of the one or more actions on the multidimensional risk score for the network.

11. The apparatus of claim 10, wherein the generative adversarial network determines the one or more actions by processing input comprising an identified network device, and identified conditions and symptoms for a category of the identified network device.

12. The apparatus of claim 10, wherein the one or more actions determined by the generative adversarial network are generated as natural language instructions.

13. The apparatus of claim 10, wherein the program instructions further comprise instructions to:
    automatically modify a configuration of a network device of the plurality of network devices based on the outcomes of applying the one or more actions.

14. The apparatus of claim 10, wherein the multidimensional risk score is determined using a regression model that is trained using a training corpus of risk reports labeled with values for each dimension of risk.

15. The apparatus of claim 10, wherein the semantic analysis model comprises a convolutional neural network that extracts names of network devices and associated features for each named network device from the plurality of risk reports.

16. The apparatus of claim 10, wherein the semantic analysis model includes a bidirectional encoder representation from transformers (BERT) model that analyzes a risk report to determine, for the risk report, a dimension of risk and a severity of risk.

17. The apparatus of claim 10, wherein dimensions of the multidimensional risk score include a best practices dimension, a product security incident response team dimension, a field notices dimension, a hardware end-of-life dimension, and a software end-of-life dimension.

18. One or more non-transitory computer readable storage media collectively having program instructions embodied therewith, the program instructions executable by a computer to cause the computer to:
   process a plurality of risk reports corresponding to a plurality of network devices in a network to determine a multidimensional risk score for the network;
   analyze the plurality of risk reports using a semantic analysis model to identify one or more factors that contribute to the multidimensional risk score;
   determine one or more actions using a trained learning model to mitigate one or more dimensions of the multidimensional risk score, wherein the trained learning model comprises a generative adversarial network that is trained using training data that includes text of risk reports and an ontology that represents a hierarchical relationship between devices, predefined conditions, and symptoms of problems associated with one or more network device of the plurality of network devices; and
   present outcomes of applying the one or more actions to a user to indicate an effect of each of the one or more actions on the multidimensional risk score for the network.

19. The one or more non-transitory computer readable storage media of claim 18, wherein the generative adversarial network determines the one or more actions by processing input comprising an identified network device, and identified conditions and symptoms for a category of the identified network device.

20. The one or more non-transitory computer readable storage media of claim 18, wherein the program instructions further cause the computer to:
   automatically modify a configuration of a network device of the plurality of network devices based on the outcomes of applying the one or more actions.

* * * * *